(12) United States Patent
Hobdy

(10) Patent No.: US 8,907,513 B2
(45) Date of Patent: Dec. 9, 2014

(54) WAVE ENERGY CONVERTER

(76) Inventor: Miles Hobdy, Fulshear, TX (US)

(\*) Notice: Subject to any disclaimer, the term of this patent is extended or adjusted under 35 U.S.C. 154(b) by 495 days.

(21) Appl. No.: 13/238,984

(22) Filed: Sep. 21, 2011

(65) Prior Publication Data

US 2012/0080883 A1    Apr. 5, 2012

Related U.S. Application Data

(63) Continuation-in-part of application No. 12/271,743, filed on Nov. 14, 2008, now Pat. No. 8,026,620.

(51) Int. Cl.
| | | |
|---|---|---|
| F03B 13/20 | (2006.01) | |
| H02K 35/02 | (2006.01) | |
| F03G 7/08 | (2006.01) | |
| H02K 7/18 | (2006.01) | |

(52) U.S. Cl.
CPC .............. F03B 13/20 (2013.01); H02K 35/02 (2013.01); *Y02E 10/38* (2013.01); F03G 7/08 (2013.01); H02K 7/1892 (2013.01)
USPC ............................ 290/53; 310/49.46; 310/152

(58) Field of Classification Search
CPC ................................ F03B 13/16; F03B 13/182
USPC ................. 310/49.46, 152, 153, 155, 154.01, 310/156.01; 290/42, 53; 405/76
See application file for complete search history.

(56) References Cited

U.S. PATENT DOCUMENTS

| | | | | |
|---|---|---|---|---|
| 4,260,901 A | * | 4/1981 | Woodbridge | 290/42 |
| 4,266,143 A | * | 5/1981 | Ng | 290/53 |
| 4,423,334 A | * | 12/1983 | Jacobi et al. | 290/53 |
| 4,599,858 A | * | 7/1986 | La Stella et al. | 60/497 |
| 5,931,062 A | * | 8/1999 | Marcovici | 81/57.31 |
| 6,153,944 A | * | 11/2000 | Clark | 290/54 |
| 6,345,789 B1 | * | 2/2002 | Rasmusson | 244/171.5 |
| 6,704,001 B1 | * | 3/2004 | Schena et al. | 345/161 |
| 7,737,569 B2 | * | 6/2010 | Hench | 290/42 |
| 2006/0028026 A1 | * | 2/2006 | Yim | 290/53 |

\* cited by examiner

*Primary Examiner* — Tran Nguyen
*Assistant Examiner* — Naishadh Desai
(74) *Attorney, Agent, or Firm* — Egbert Law Offices, PLLC

(57) ABSTRACT

A wave energy converter has a shell, a pendulum pivotally positioned in the shell and having either a magnet or a coil connected or interconnected thereto, a variable inductor for varying an inductive capacity and positioned in the shell, and a pendulum adjuster operatively connected to the pendulum so as to change a center of gravity of the pendulum. The variable inductor has either a magnet and a coil connected or interconnected thereto. At least one of the magnet and the coil oscillates relative to the magnet or the coil of the variable inductor. A shaft is connected to the pendulum so as to move in relation to the pivotal movement of the pendulum.

20 Claims, 16 Drawing Sheets

WAVE ENERGY CONVERTER

CROSS-REFERENCE TO RELATED APPLICATIONS

The present application is a continuation-in-part of U.S. patent application Ser. No. 12/271,743, filed on Nov. 14, 2008, and entitled "Wave Energy Converter", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the conversion of mechanical energy to electrical energy. More particularly, the present invention the relates to apparatus that convert energy provided by waves in a body of water into electricity. More particularly, the present invention relates to apparatus utilizing magnetic induction.

2. Description of Related Art Including Information Disclosed Under 37 CFR 1.97 and 37 CFR 1.98

With rising oil prices, more and more efforts are being made to find alternative energy sources. Alternative energy sources include biomass (such as biodiesel), geothermal energy, solar energy, wind energy, and wave power. Wave power is a form of renewable energy. Therefore, wave power is a very desirable alternative to non-renewable sources, such as oil and coal. The apparatus that harness the energy of waves are commonly referred to as wave energy converters (WECs). The technology for wave power energy conversion is in the early stages in that much research and development is going into technology relating to the conversion of wave energy to electricity.

A WEC is device that converts the mechanical energy of the waves of a body of water, such as the ocean, into electrical energy. The electrical energy is typically in the form of electricity. The obvious benefit of utilizing the motion of waves for the production of electrical energy is the abundance of ocean waves, the low cost of converting wave energy into electrical energy, extremely low emissions in such conversion, and very little environmental impact of devices that perform such a conversion.

Many attempts to harness wave energy have yielded varying degrees of success. For example, several foreign companies have engineered and fielded new WEC concepts. Most of the companies involved in bringing these various concepts to market are located in Europe where mandates for sustainable renewable energy supplies follow the Kyoto Accord for reduction in carbon emissions. Several European nations are signatories to the Kyoto Accord and therefor have set forth various goals for implementing new power generating technologies, including onshore and offshore wind farms, WECs, and subsea turbine devices utilizing stable ocean and river currents. European nations lead the United States in the pursuit of alternative energies. For example, the Norwegian classification authority (Det Norske Veritas) has guidelines for the design and construction of WECs. Therefore, there is a need for the development of WECs in the United States.

In order to fully maximize the use of wave power, a WEC must adapt to the prevailing wave environment. That is, the apparatus must adapt to the transient amplitude, frequency, and phase of the waves of a body of water. One problem associated with WECs is that to adapt to the transient nature of waves, the apparatus of the WEC must change a mass, stiffness or damping characteristic. Many WECs are not equipped to respond to the changes in waves. The ability of a WEC to respond to transient waves requires additional components and complexity, which further compounds the potential maintenance and reliability issues of a WEC.

Another problem associated with current WECs is that the parts that convert wave energy to electrical energy are exposed directly to the environment. Therefore, these parts are subject to corrosion and disrepair. Thus, there is a need for a WEC that protects the energy-converting parts from the environment.

Various patents have been issued relating to WECs. For example, U.S. Pat. No. 7,305,823, issued on Dec. 11, 2007 to Stewart et al., discloses a wave energy converter having two elements intended to be placed in a body of water. The two elements are able to move relative to each other in response to forces applied to the wave energy converter by the body of water. At least one of the two elements is a wave energy absorber. A mechanism is connected between the two elements so as to extract energy from the wave energy converter for producing output electric energy as a function of the movement between the two elements. Another mechanism is connected between a source of energy and one of the two elements. The mechanism senses and determines the displacement, velocity, and acceleration of one of the two elements relative to the other for selectively and actively supplying energy to one of the two elements so as to cause an increase in the displacement and velocity of one of the two elements relative to the other.

U.S. Pat. No. 6,291,904, issued on Sep. 18, 2001 to Carroll, discloses an open-ended tube that is mounted in a fixed, vertical orientation within a body of water. The top and bottom ends of the tube are positioned at preselected depths relative to an average water level. The tube-top open end is disposed at a first depth approximately equal to, but not less than, the maximum preselected wave amplitude so that the top end is always submerged. The tube-bottom open end is disposed at a depth where the energy level associated with preselected waves of maximum wavelength is small. Water flows into and out of the tube in response to pressure variations caused by passing waves. A piston is disposed within the tube for converting the water flow to useful energy.

U.S. Pat. No. 7,352,073, issued on Apr. 1, 2008 to Ames, discloses an ocean wave energy converter that has a generator with a rotating inner rotor surrounded by a counter-rotating outer rotor for generating electricity. A reciprocating drive rod drives the inner rotor on the downstroke of the drive rod and the outer rotor on the upstroke of the drive rod through a gear-driven driveshaft with clutches. A buoy is attached to an end of the drive rod whereby the undulation of the ocean waves relative to the buoy reciprocates the drive rod between the upstroke and the downstroke positions.

U.S. Pat. No. 7,298,054, issued on Nov. 20, 2007 to Hirsch, discloses a wave energy conversion system that includes a base substantially connected to a wave-medium floor, a tidal platform connected to the base, and a tidal float connected to the tidal platform. An axle is connected to the tidal platform with an inductive coil positioned within the axle such that an axis of the inductive coil is parallel to the axle. A magnetic sleeve includes a magnetic sleeve opening such that the axle passes through the magnetic sleeve opening. A float member is connected to the magnetic sleeve. A moving wave causes displacement of the float member. The float member causes the magnetic sleeve to move relative to the inductive coil and to generate electrical energy within the inductive coil.

U.S. Pat. No. 5,512,795, issued on Apr. 30, 1996 to Epstein et al., discloses an electrical energy generator that has a cylindrical stator, a cylindrical liner of a piezoelectric material in concentric contact with the stator, and an armature rotatable about the liner. In one embodiment, as the armature rotates, the armature squeezes successive portions of the liner against the stator for alternately compressing and decompressing the liner portions for causing them to generate electrical energy. In another embodiment, the armature causes alternating stretching and destretching of successive portions of the liner between spaced-apart portions of the stator for causing the liner portions to generate electricity.

U.S. Pat. No. 4,748,338, issued on May 31, 1988 to Boyce, discloses an apparatus for extracting energy from the waves on a body of water that includes an assembly having a buoyancy sufficient for maintaining the assembly afloat in the water. The apparatus has a series of structures mounted on the assembly that have generally upwardly-oriented beams that have upper ends connected at least indirectly to one another. A pendulum drive shaft is suspended by a cable from the upper end of the beams. Each structure has a pulley at the upper ends of the beams through which a continuous loop of the cable passes so as to suspend the pendulum drive shaft and permit the pendulum drive shaft to rotate. A ratcheted pulley mounted at the lower end of each of the beams has a second continuous loop of cable passing therethrough. The second continuous loop of cable also loops around the pendulum drive shaft causing the pendulum drive shaft to rotate as it swings by rolling within the loop of the second cable which is anchored by the ratcheted pulley. The second cable is prevented from turning by the ratchet during the forward swing of the pendulum.

U.S. Pat. No. 4,492,875, issued on Jan. 8, 1985 to Rowe, discloses a buoy generator that has a hollow buoy having inner and outer surfaces, a winding mounted to the buoy parallel to the inner and outer surfaces, a magnetized member freely disposed in all dimensions within the hollow buoy for unrestricted rolling on the inside surface of the hollow buoy whenever the hollow buoy has any rolling movement, and a mechanism connected to an end of the windings for rectifying current flow therefrom. Upon mooring the buoy in the water, the flux lines of the magnetized roller cut the winding when there is water motion. Electrical current is provided by the winding to the rectifying mechanism.

U.S. Pat. No. 4,423,334, issued on Dec. 27, 1983 to Jacobi et al., discloses a wave motion powered electrical generator configured for installation in a buoy. The generator has an inverted pendulum with two windings formed at the free end thereof. The windings are aligned to articulate between two end stops. Each stop is provided with a magnetic circuit. As the loops thus pass through the magnetic circuit, electrical current is induced which may be rectified through a full-way rectifier to charge a battery. The buoy itself may be ballasted to have its fundamental resonance at more than double the wave frequency with the result that during each passing of a wave at least two induction cycles occur.

U.S. Pat. No. 4,352,023, issued on Sep. 28, 1982 to Sachs et al., discloses a mechanism for generating power from wave motion on a body of water. The mechanism includes a buoyant body which is adapted to float on a body of water and to roll and pitch in response to the wave motion of the water. A gyro-wave energy transducer is mounted on the buoyant body for translating the pendulum-like motions of the buoyant body into rotational motion. The gyro-wave energy transducer includes a gimbal that has first and second frames. The first frame is pivotally mounted to the second frame. The second frame is pivotally mounted to the buoyant body. A gyroscope is mounted to the first frame for rotation about an axis perpendicular to the axes of rotation of the first and second frames. A generator is coupled to the gyroscope for maintaining a controlled rotational velocity for the gyroscope. Transferring members are associated with one of the first and second frames for transferring torque of one of the first and second frames to the gyroscope.

U.S. Pat. No. 4,317,047, issued on Feb. 23, 1982 to de Almada, discloses an apparatus for harnessing the energy derived from the undulatory motion of a body of water that includes an assembly having a buoyancy sufficient for maintaining it afloat in the water, a first structure substantially following multidirectional undulatory motions of the water, and a second structure mounted in the assembly for free movement in a plurality of planes with respect to the first structure. The second structure is displaceable by gravity and by forces derived from the motions of the first structure. A device is connected to the first and second structures for generating a pressure output in response to the force derived from the relative motions between the first and second structures. An arrangement is coupled to the pressure output of the device for utilizing, at least indirectly, the energy derived from the pressure output.

U.S. Pat. No. 4,266,143, issued on May 5, 1981 to Ng, discloses an energy conversion device which utilizes the natural movements of ocean waves to produce electrical energy. The apparatus is contained in a tank which is adapted to float near the surface of the water and tilt from side-to-side about a pivot point located below the tank, thereby simulating a pendulum-like movement. A sinker weight is employed to produce the appropriate movement of the tank and maintain the floating tank in balance at the ocean surface. The pendulum motion of the tank is used to roll gravity wheels in the tank in such manner that shafts associated with the gravity wheels are caused to rotate. Electrical generators are operatively connected to the rotating shafts for producing electrical energy from the mechanical rotational energy of the shafts as the tank tilts from side to side with the wave motion.

U.S. Pat. No. 4,260,901, issued on Apr. 7, 1981 to Woodbridge, discloses a system for converting the mechanical energy in the wave motion of a body of water into electrical energy. A frame is fixed with respect to the wave motion of the water. A flotation element is buoyantly supported by the water and constrained to follow only the vertical component of the wave motion. The motion of the flotation element is transferred to an electrical generating device which includes a device for producing electromagnetic flux and electrical coils. The motion of the flotation element causes relative motion between the flux-producing device and the electrical coils thereby generating an electromotive force. A positioning subsystem is provided for moving the electrical generating device relative to the flotation element when the average depth of the body of water changes so as to maintain a symmetrical relative motion between the flux-producing device and the electrical coils.

U.S. Pat. No. 4,251,991, issued on Feb. 24, 1981 to Wood, discloses an apparatus for generating power from the motion of a wave on a body of water that utilizes a spine formed by buoyant sections that are joined end-to-end and are ballasted so as to cause the sections to assume a predetermined position in calm water. Adjacent sections are joined in a manner enabling the sections to pivot more easily about at least one non-vertical axis when the sections are in the predetermined position. When the apparatus is subjected to wave motion the surge component of the wave motion is converted to vertical motion of the spine. Prime movers are mounted on the spine so as to rock relative to the spine under the heave component of wave motion, and under the vertical motion of the spine. The rocking motion of the prime movers is utilized to produce energy.

U.S. Pat. No. 4,110,630, issued on Aug. 29, 1978 to Hendel, discloses a wave-powered electric generator. The generator includes a buoyant envelope tethered to a fixed point relative to the sea bottom. The buoyant envelope is water and air-tight. One or more stators and one or more elements moveable by the force of inertia are positioned within the stator. The buoyant envelope is a rectifier for rectifying the electric energy generated by the moveable element. A power transmission mechanism supplies the generated and rectified electric energy to a power station. In a preferred embodiment, a conductive fluid is employed as a moveable element. The fluid is passed through a concentrated magnetic field.

U.S. Pat. No. 3,696,251 issued on Oct. 3, 1972 to Last et al., discloses an electric generator for deriving electrical energy from oscillatory motion such as that of buoys, vehicles and animals. The generator has a stator and an armature coupled together by a spring mechanism. The coupling generates current when bodily movement of the generator causes, by inertia effects, relative movement of the armature and stator.

It is an object of the present invention to provide a wave energy converter that improves power generation.

It is another object of the present invention to provide a wave energy converter that protects critical system components from direct contact with the ocean and its surrounding environment.

It is another object of the present invention to provide a wave energy converter that reduces long term maintenance costs.

It is still another object of the present invention to provide a wave energy converter that reduces inactivity due to adverse environmental conditions.

It is another object of the present invention to provide a wave energy converter that utilizes a permanent magnet.

It is still another object of the present invention to provide a wave energy converter that can be placed in any body of water having waves.

It is another object of the present invention to provide a wave energy converter that utilizes magnetic induction to convert wave energy into electrical energy.

It is still another object of the present invention to provide a wave energy converter that maximizes energy conversion for various wave frequencies.

It is another object of the present invention to provide a wave energy converter that maximizes energy conversion for various wave sizes.

It is another object of the present invention to provide a wave energy converter that varies inductive capacity.

These and other objects and advantages of the present invention will become apparent from a reading of the attached specification and appended claims.

BRIEF SUMMARY OF THE INVENTION

The present invention is a wave energy converter that has a shell, a pendulum pivotally positioned in the shell, and a variable inductance means for varying an inductive capacity, and a pendulum adjuster operatively connected to the pendulum so as to change the center of gravity of the pendulum. The pendulum has one of a magnet and a coil connected or interconnected thereto. The variable inductance means is positioned in the shell. The variable inductance means has another of a magnet and a coil connected or interconnected thereto. One of the magnet and the coil of the pendulum oscillates in relation to another of the magnet and the coil of the variable inductance means.

In one embodiment of the present invention, a shaft is connected to the pendulum such that shaft rotates relative to the pivotal movement the pendulum. A wheel is connected to the shaft so as to rotate in correspondence with the rotation of the shaft. The variable inductance means includes a generator having a shaft in engagement with the wheel. In particular, the variable inductance means can includes a plurality of generators that are selectively engageable with the wheel. A controller is electronically connected to the plurality of generators so as to selectively engage one or more of the plurality of generators with the wheel. In particular, the wheel has teeth formed on a periphery thereof. The shaft of the generator has a pinion thereon in toothed engagement with the teeth of the wheel. A braking means serves to stop or slow the rotation of the shaft and also, in correspondence, for stopping or slowing the pivotal movement of the pendulum. This braking means can include a disk affixed to the shaft that extends radially outwardly thereof and a caliper brake positioned over a surface of the disk so as to selectively exert a frictional force against the disk. The shaft of the generator can have a clutch operatively connected thereto so as to selectively release the shaft of the generator from operative connection with the rotation of the wheel. This is another way to vary the inductive capacity of the wave energy converter. Also, a mechanical rectifier can be connected between the shaft and the wheel such that the wheel rotates in only a single direction. The shaft is an input shaft of the mechanical rectifier. The wheel is affixed to an output shaft of the mechanical rectifier.

As used herein, the term "variable inductance means" applies to various approaches for varying an inductance of an electrical generating device. In particular, this can be accomplished by: (1) adding or removing conductors (e.g. coils or windings) which actively produce an electrical current; or (2) altering a relationship between the prime mover and the magnets or coils affecting the relative motion relationship between the components; or (3) using a commercially available variable inductance generator. Such commercially available variable inductance generators inherently come with our contain hardware which allows the generating (inductive) capacity to be altered, as desired. The device would require the use of a controlled and control algorithm for selectively altering the inductive capacity.

In another embodiment of the present invention, the shaft is slidably positioned in the vessel. The shaft is interconnected with the pendulum such that a pivotal movement of the pendulum causes a linear reciprocating motion of the shaft. In this embodiment, the variable inductance means comprises at least one magnet positioned on the shaft and at least one coil positioned adjacent to the magnet. The coil is of a fixed positioned relative to the linear reciprocating motion of the shaft. The pendulum has a mounting adjacent an end thereof. This mounting has a slot therein. The shaft has a pin received in the slot of the mounting. The pin is slidable in the slot during the pivotal movement of the pendulum so as to correspondingly cause the linear reciprocating motion of the shaft.

In another form of this invention, a hollow shaft is positioned over the shaft such that the linear reciprocating motion of the shaft causes a rotational movement of the hollow shaft. A disk is connected to the hollow shaft so as to selectively rotate relative to the rotational movement of the hollow shaft. In this form of the invention, the variable inductance means includes a magnetic surface formed on or affixed to the disk and a coil positioned in proximity to the magnetic surface of the disk. The shaft has a helical surface thereon. The hollow shaft has a surface on an interior thereof engaged with the helical surface of the shaft. The disk is in clutched engagement with the hollow shaft. In particular, the disk can include a plurality of disk that are connected to the hollow shaft. Each of the plurality of disks can have a different outer diameter. Also, the disk can be connected by a planetary gear set such that the disk rotates at a faster rate of rotation than a rotation of the hollow shaft.

In still another form of the present invention, there is a mechanical rectifier having an input shaft connected or interconnected to the pendulum and an output shaft extending therefrom. The output shaft rotates in only a single direction. A flywheel is connected to the output shaft of the mechanical rectifier. The variable inductance means includes a generator having a shaft operatively connected to the flywheel.

DETAILED DESCRIPTION OF THE INVENTION

Figure 1:
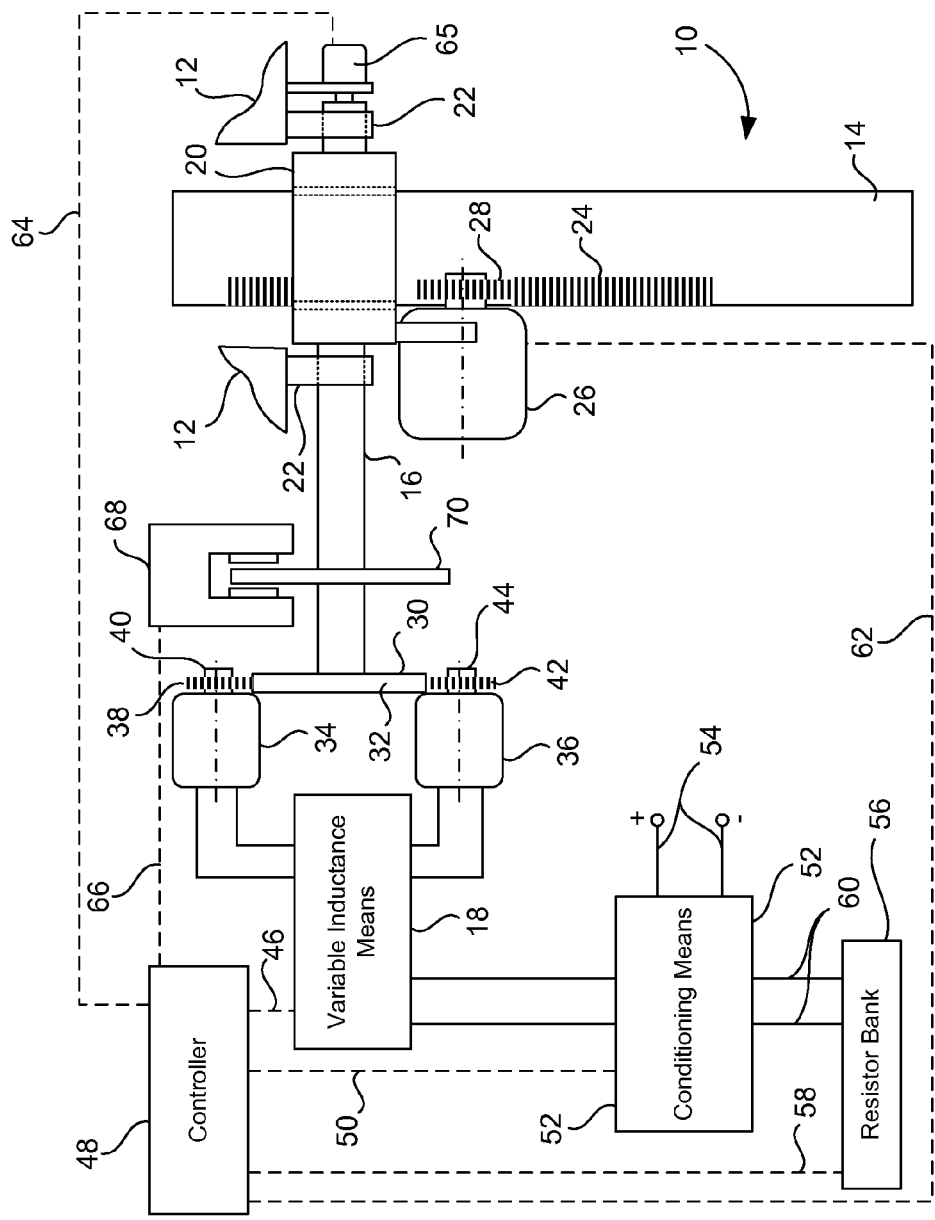
FIG. 1 shows a diagrammatic illustration of a preferred embodiment of the wave energy converter of the present invention.

Referring to FIG. 1, there is shown the wave energy converter 10 in accordance with the preferred embodiment of the present invention. The wave energy converter 10 includes a shell 12 (illustrated in partial fashion), a pendulum 14 pivotally positioned in the shell 12, a shaft 16 connected to the pendulum 14 so as to rotate in relation to the pivotal movement of the pendulum 14, and a variable inductance means 18 operatively connected to the shaft so as to produce electrical energy from the rotation of the shaft and from the pivotal movement of the pendulum 14.

In particular, in FIG. 1, the pendulum 14 is positioned in a housing 20. Housing 20 is connected the shaft 16. The pendulum 14, along with the housing 20, is pivotally connected to the shell 12 through the use of bearings 22. As such, the pendulum 14 is free to pivot back-and-forth in relation to the shell 12. The pendulum 14 is illustrated as having a rack 24 thereon. A pendulum adjuster 26 has a gear 28 that is engaged with the rack 24. As such, the pendulum adjuster 26 can be suitably actuated so as to rotate the gear 28 for the movement of the pendulum 14 upwardly and downwardly. This, in correspondence, causes the center of gravity of the pendulum 14 to be suitably adjusted.

The shaft 16 has a wheel 30 affixed thereto. Wheel 30 has suitable teeth 32 (not known) extending around the periphery thereof.

The variable inductance means 18 is illustrated as having a first generator 34 and a second generator 36. Generator 34 has a pinion 38 connected to a shaft 40 extending from the generator 34. Similarly, the generator 36 has a pinion 42 affixed to a shaft 44 extending from the generator 36. In this manner, as the wheel 30 rotates (because of the rotational movement of the shaft 16 and the pivotal movement of the pendulum 14), a similar rotational movement is imparted to the gears 38 and 42 and, through the action of the respective shafts 40 and 44, to the respective generators 34 and 36. The generators 34 and 36 will generate electrical energy in the manner of typical generators in which a rotor-and-stator arrangement causes magnetic interaction to create the requisite electrical energy.

The variable inductance means 18 is connected by a line 46 to controller 48. The controller 48 is interactive with the variable inductance means 18 so as to control how many of the generators 34 and 36 should be engaged with the wheel 30. The variable inductance means 18 selectively determines the number of generators that are switched into or out of the electrical current generating circuit. As such, the controller 48 will attempt to optimize the production of energy relative to the sea state affecting the pendulum 14. The controller 48 is also connected by a line 50 to a conditioning means 52. The conditioning means 52 carries out rectification so as to condition the electricity that is transmitted along lines 54. A resistor bank 56 is connected by line 58 to the controller 48 and also connected by lines 60 to the conditioning means 52. The resistor bank compensates for the excess production of electricity by converting it to heat. The controller 48 is also connected along line 62 to the pendulum adjuster 26. Controller 48 can further be connected to a shaft rotational sensor 65 along line 64. The controller 48 is also connected along line 66 to a caliper brake 68. The shaft 16 has a disk 70 extending radially therefrom. The caliper brake 68 is in the form of a conventional brake in which a pair of pads can exert a frictional force so as to slow or stop the rotation of the disk 70, along with the connected shaft 16 and pendulum 14. As a result, the pivotal movement of the pendulum 14 can be slowed or controlled by the activation of the caliper brake 68.

In FIG. 1, it can be seen that the wave energy converter 10 utilizes at least two electrical generating devices that are coupled to the housing 20 through the use of the gears 38 and 42 for the purpose of generating electricity from the oscillatory motion of the pendulum 14. Additionally, an optimum amount of electricity can be produced not only by adjusting the center of gravity of the pendulum 14 through the use of the pendulum adjuster 26 relative to the pivotal axis of the rotation, but in conjunction, selectively engaging or disengaging the electrical output of the electrical generating devices. The engagement or disengagement of the electrical generating devices is accomplished with the controller 48, along with a predetermined control algorithm. The controller monitors the various sensors within the wave energy converter 10. The controller 48, together with the variable inductance means 18, selectively engages or disengages the generators 34 or 36 (or a larger number thereof which would be disposed around the wheel 30). The variable inductance means 18 thus has the capability of varying the damping of the pendulum's motion through energy extraction.

Additionally, for the purpose of damping and, in some cases, braking, the pendulum's disk brake and caliper assembly can also be used. Further to this capability is the ability to perform dynamic braking or rheostatic braking by passing the produced electrical energy from the generating devices to the resistor bank. The pendulum motion damping and braking would also be a function of the controller 48.

In the present invention, a mechanical energy, such as a wave, is imparted upon the shell 12. Because the pendulum 14 is connected to the shell 12, some of the energy imparted onto the shell 12 is transferred to the pendulum 15. Although mechanical energy can be exerted upon the shell 12 in any three-dimensional direction, for the purpose of mathematical simplicity, only the applied horizontal motion of the wave against the shell 12 is used to demonstrate the efficiency of the wave energy converter 10 of the present invention. The following equation is the basic differential equation of motion for a pendulum 14 that is acted upon by an external force at its pivot along with a damping force:

$$I\theta'' + c\theta' + mgd\theta = -mx'' \qquad \text{eqn.(1)}$$

The symbol "I" is the moment of inertia the pendulum 14. The symbol "c" is the damping coefficient. The symbol "m" is the mass of the pendulum 14. The symbol "g" is the gravitational constant. The symbol "d" is the distance between the center of gravity of the pendulum 14 and the pivot axis of the pendulum 14. The symbol "x''" is the acceleration of the pendulum 14 as a function of the mechanical energy, i.e. wave, acting upon the wave energy converter 10. For simplicity purposes, x'' and θ are considered sinusoidal-varying functions expressed in terms of a single circular frequency, ω, and time, t. Applying the sinusoidal functions and rewriting the equation produces the following equation:

$$I\Theta\omega^2 * \sin(\omega t - \phi + \pi) + c\Theta\omega * \sin(\omega t - \phi + \pi/2) + mgd\Theta * \sin(\omega t - \phi) = mx\omega^2 * \sin(\omega t) \qquad \text{eqn.(2)}$$

As known from the study of mechanical system dynamics, a system acting under the influence of a time-varying force will experience resonance when the frequency of the time-varying force is equal to the natural frequency of the system itself. The resonance condition represents the condition of maximum energy transfer between the time-varying force and the mechanical system. The natural frequency of a pendulum is strictly based on the distance between the center of gravity of the pendulum and the pivot axis of the pendulum, independent of the mass of the pendulum.

Thus, the pendulum 14 of the present invention has a pendulum adjuster 26 that adjusts the distance between the center of gravity of the pendulum 14 and the pivot axis of the pendulum 14. The pendulum adjuster 26 moves the pendulum up and down relative to the housing 20 so as to change the distance of the center of gravity and the pivot axis. A greater distance between center of gravity and the pivot axis of the pendulum causes the pendulum to oscillate more slowly. A small distance between the center of gravity and the pivot axis of the pendulum causes the pendulum to oscillate more quickly. Thus, if the wave has a high frequency of recurrence, the pendulum adjuster 26 adjusts the distance between the center of gravity and the pivot axis so that the pendulum will swing quicker so as to achieve a harmonic resonance with the frequency of the wave and thus optimize the amount of electricity generated by the generators 34 and 36 of the variable inductance means 18. If the frequency of the wave is low, then the pendulum adjuster 26 increases the distance between the center of gravity and the pivot axis so that the pendulum swings, or oscillates, more slowly so as to match the harmonic resonance of the waves and optimize the generation of electricity.

The circular natural frequency of the pendulum is expressed as a function of the distance between the center of gravity of the pendulum and the pivot axis of the pendulum by the following equation:

$$\omega = (g * d / 0.083 * L^2 * d^2)^{0.5} \qquad \text{eqn.(3)}$$

The symbol "d" is the distance between the center of gravity of the pendulum 14 and the pivot axis of the pendulum 14. The symbol "L" is the length of the pendulum 14, which is constant because the length of the pendulum 14 is always the same. "ω" and "g" were defined above.

The above equation is used by the controller 48 positioned in the shell 12. A motion sensor is positioned in the shell 12 so as to sense the frequency of the wave. This frequency is then used in the above equation as the circular natural frequency of the pendulum, and the controller 48 then calculates the distance d that is needed between the center of gravity of the pendulum 14 and the pivot axis of the pendulum 14 so as to have the pendulum 14 match the frequency of the wave. Manipulation of the symbol "d" effects both the inertial and gravitational terms of the second equation above. Once the controller 48 knows the distance needed for the pendulum 14, the pendulum adjuster 26 is activated by the controller 48 so as to change the distance between the center of gravity and the pivot axis 48. The position sensor 65 communicates the position of pendulum 14 to the controller 48.

The damping term, $c\Theta\omega$, of the second equation is a mathematical expression for the rate of energy removal from the WEC 10. Varying this term controls the rate at which energy is converted from mechanical energy to electrical energy. The rate as which energy is converted from mechanical energy to electrical energy in the WEC 10 of the present invention can be varied by controlling the amplitude of the motion of the pendulum 14. Alternatively, the amplitude of the pendulum 14 can be controlled with a brake 68 operatively connected to the pivot axis of the pendulum 14, however, no useful energy is produced. Controlling the amplitude of the motion of the pendulum 14 allows the wave energy converter 10 to be designed to operate over a defined range of motion which is useful in determining the overall dimensions of the pendulum 14.

It should be noted that the amplitude of rotation is governed by how closely the pendulum adjusting means tunes the pendulum to its resonant position and by how much damping the variable inductance means allows to become active. These functions are the primary means for controlling the amplitude of the pendulum. If it is determined that further action is necessary, the controller can engage either partially or in combination the disk brake, the rheostatic brake and/or the regenerative brake. It should be noted that the disk brake produces no useful energy due to its application. The heat thus produced cannot be conveniently converted or stored. The resistor bank represents a rhoestitic method of braking by using the electricity produced to generate heat through the resistors. As such, it slows the motion of the pendulum. The pendulum can also be slowed by methods similar to the regenerative method of braking by charging a battery or capacitor bank.

Figure 2:
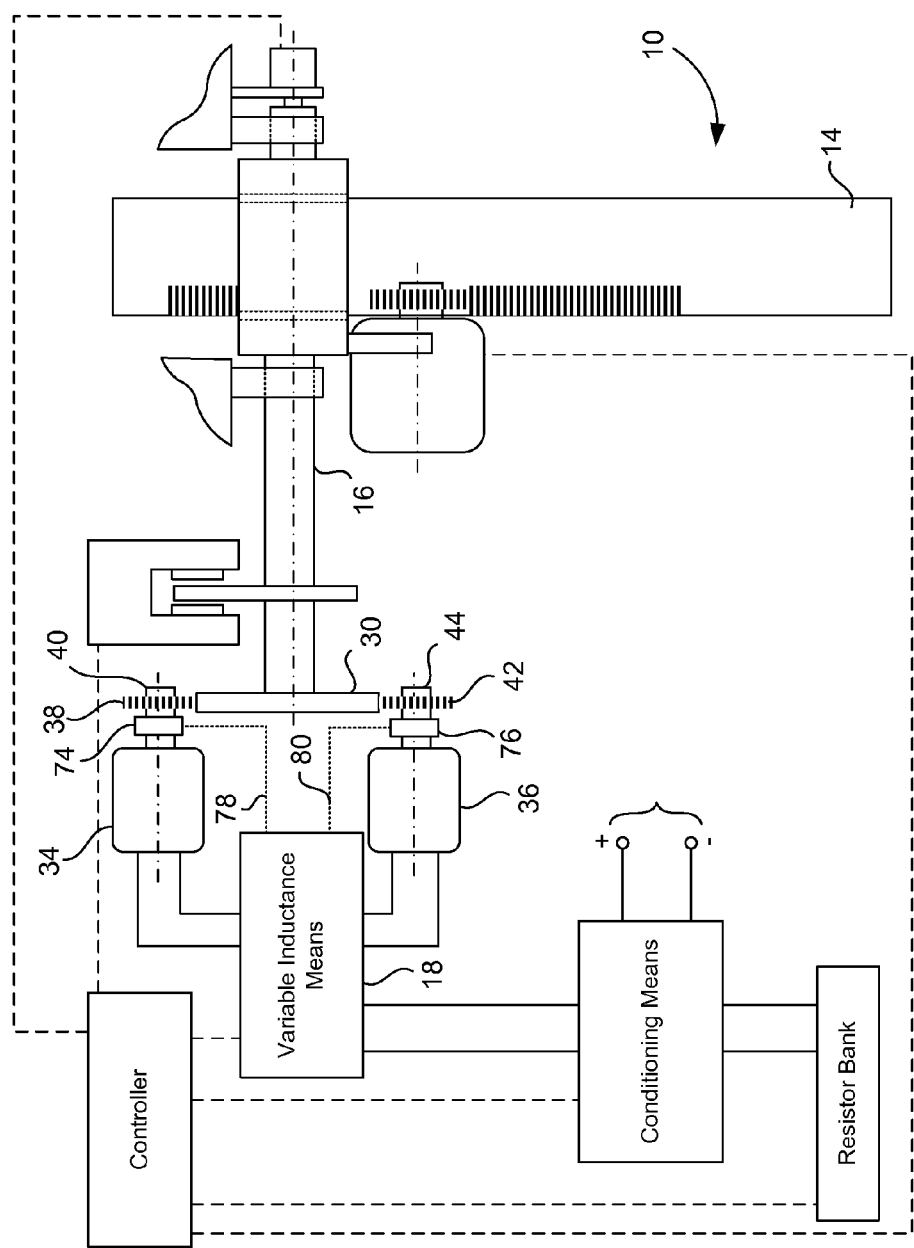
FIG. 2 shows a diagrammatic illustration of the preferred embodiment of the present invention in which the generator is connected by a clutch to the shaft of the pendulum.

FIG. 2 is alternate form of the wave energy converter 10 as illustrated in FIG. 1. As shown in FIG. 1, there is a pendulum 14 having a shaft 16 extending to a wheel 30. The generators 34 and 36 have respective shafts 40 and 44 extending therefrom. Shafts 40 and 44 respectively have gears 38 and 42 affixed thereto.

Importantly, in FIG. 2, it can be seen that there is a clutch 74 operatively connected to the shaft 40. Similarly, there is another clutch 76 that is operatively connected to the shaft 44. The variable inductance means 18 includes lines 78 and 80. Line 78 is connected to the clutch 74. Line 80 is connected to the clutch 76.

In FIG. 2, if it is desired to disengage the generator 34, the clutch 74 can be disengaged so that the gear 38 rotates freely with the rotation of the wheel 30 without transmitting rotational energy into the generator 34. If more power is required, then the clutch 74 will be engaged so that this rotational energy can be imparted to the generator 34. Similarly, line 80 will transmit a signal to the clutch 76 so as to disengage the generator 36 from the gear 42. As a result, the gear 42 will rotate freely with a rotation of the wheel 30. If the signal is transmitted along line 80 to the clutch 76 to engage the gear 42, then the gear 42 will rotate so as to produce electrical energy from the generator 36. As such, FIG. 2 shows a mechanical technique for disengaging the gears 38 and 42 from the respective generators 34 and 36.

Figure 3:
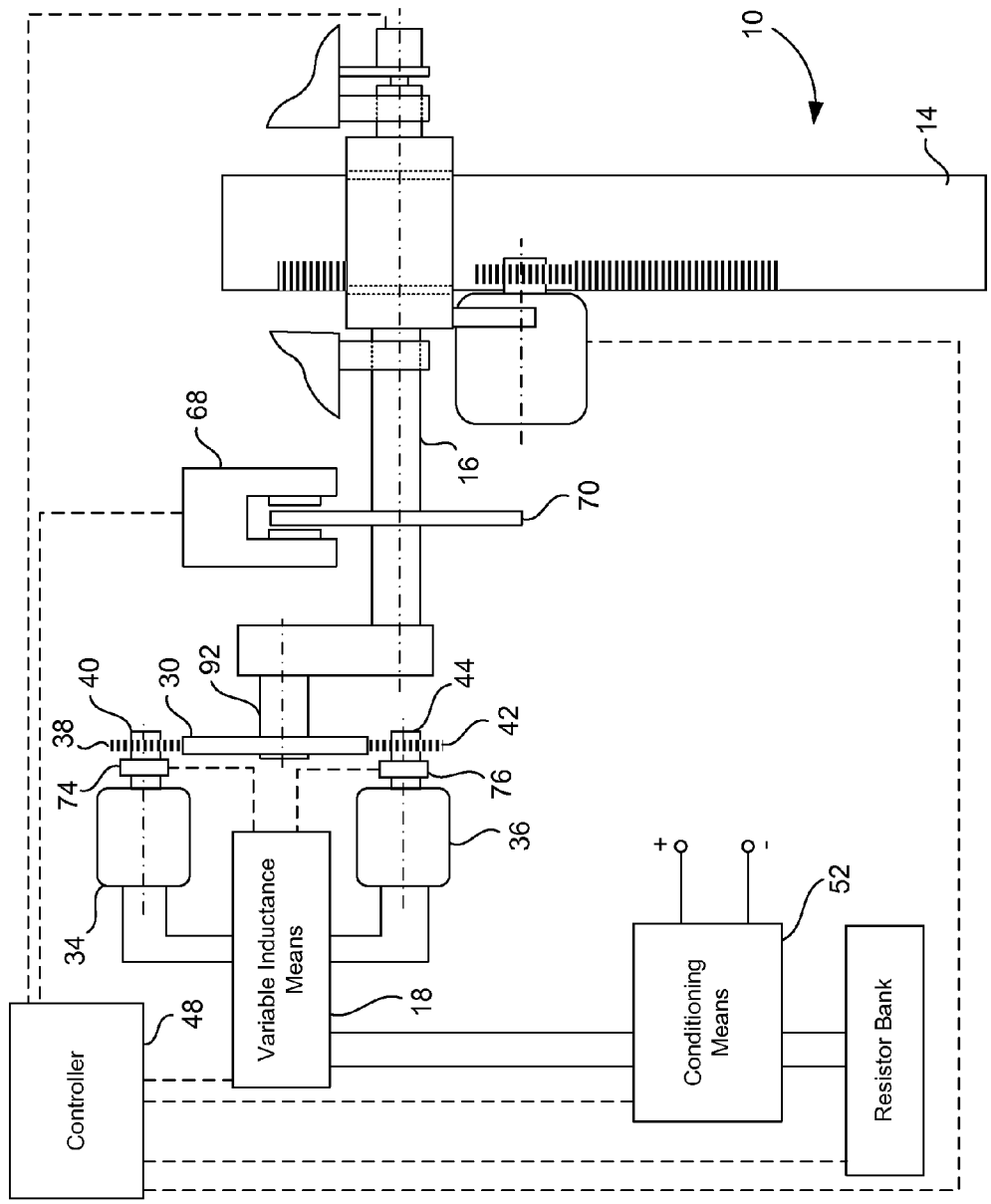
FIG. 3 shows a diagrammatic illustration of the preferred embodiment of the present invention in which the wheel is connected by a mechanical rectifier to the shaft of the pendulum.

FIG. 3 shows another form of the invention of FIG. 1. In particular, the wave energy converter 10 includes the pendulum 14 that is connected to the shaft 16. In FIG. 3, the shaft 16 has a mechanical rectifier 90 connected thereto. The shaft 16 will be connected to or be part of the input shaft to the mechanical rectifier 90. The mechanical rectifier 90 has an output shaft 92 that is connected to the wheel 30. As before, the wheel 30 has a geared outer surface that engages with the gears 38 and 42 of the generators 34 and 36. The clutches 74 and 76 are placed on the respective shafts 40 and 44 in the manner herein in association with FIG. 2.

A mechanical rectifier is a series of gears, and other components, which will cause a unidirectional movement of the output shaft 92. As can be appreciated in FIG. 3, the pivotal movement of the pendulum 14 will cause the shaft 16 to rotate in one direction and then rotate in another direction. If the back-and-forth rotational movement is transmitted to the generators 34 and 36, then the conditioning means 52 will have to be more robust in order to make the power compatible for delivery to the end user. However, in the form of the invention shown in FIG. 3, the mechanical rectifier 90 will convert the back-and-forth rotational movement of the shaft 16 into a unidirectional rotational movement of the output shaft 92. As a result, the wheel 30 will only rotate in one direction. Correspondingly, the gears 38 and 42 will also rotate in only a single direction. As a result, only a single direction of rotation of the shafts 40 and 44 of the respective generators 34 and 36 is created. The damping of the pendulum 14 can be controlled by selectively engaging the clutch devices 74 and 76 using the variable inductance means 18.

It can be seen that the disk 70 of the caliper brake 68 is positioned on or coupled to the input shaft 16 of the mechanical rectifier 90. As such, the controller 48 is able to properly control and dampen the pivotal movement of the pendulum 14, in the manner described herein previously.

Figure 4:
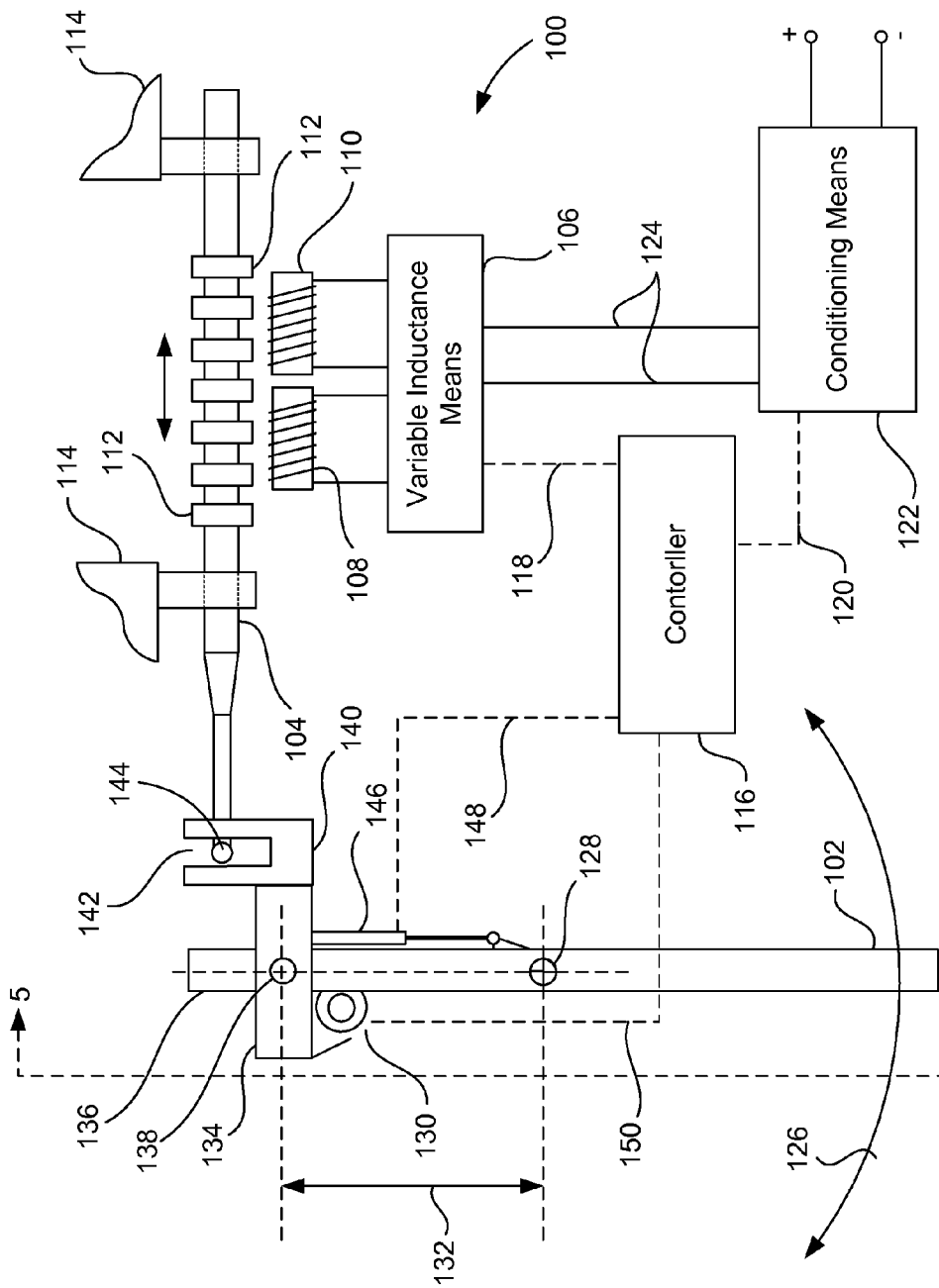
FIG. 4 shows a diagrammatic illustration of an alternative embodiment of the present invention in which the shaft is connected in a linear reciprocating manner to the pendulum.

FIG. 4 shows an alternative embodiment of the wave energy converter 100 of the present invention. The wave energy converter 100 includes a pendulum 102 that is operatively interconnected to a linear reciprocating shaft 104. The variable inductance means 106 has a pair of coils 108 and 110 positioned adjacent to the magnets 112 connected to the shaft 104. The shaft 104 is supported in a slidable linear-reciprocating manner within a fixed position of the shell 114. A controller 116 is connected by line 118 to the variable inductance means 106 and also connected by line 120 to the conditioning means 122. Similarly, the variable inductance means 106 is also connected to the conditioning means 122 through the lines 124.

In FIG. 4, it can be seen that the pendulum 102 swings back-and-forth in the direction of arrow 126. The pendulum 102 has a center of gravity 128. A pendulum adjuster 130 is connected to the pendulum 102 so as to raise and lower the center of gravity 128 of the pendulum 102. A mounting 134 allows the upper end 136 of the pendulum 102 to pass therethrough. The pendulum 102 has an axis of rotation 138. As such, the pendulum 102 will swing back-and-forth along this axis of rotation 138. The mounting 134 will swing angularly back-and-forth in correspondence with the pivotal movement of the pendulum 102 along path 126. The mounting 134 includes a bracket 140 secured thereto. Bracket 140 has a slot 142 formed therein.

The shaft 104 has a pin 144 received within the slot 142. As the pendulum 102 swings back-and-forth, the bracket 140 will move with the movement of the mounting 134 back-and-forth. This will cause the pin 144 to move along the path of the slot 142 so as to correspondingly move the shaft 144 in a linear reciprocating manner. The movement of the magnets 112, attached to the shaft 104 in relation to the coils 108 and 110, will generate electricity in a known manner. A linear transducer 146 is connected to the mounting 134 and also connected to the pendulum 102. This linear transducer 146 serves as a linear position sensor so as to transmit information as to where the center-of-gravity of the pendulum 102 is relative to the pivot axis 138. This position is illustrated by dimension line 132. The information of the linear transducer 146 will be transmitted along line 148 to the controller 116. Additionally, the operation of the pendulum adjuster 130 is transmitted along line 150 to the controller 116 so that the controller 116 can adjust the center-of-gravity 128 so as to optimize the performance of the wave energy converter 100 of the present invention.

Figure 5:
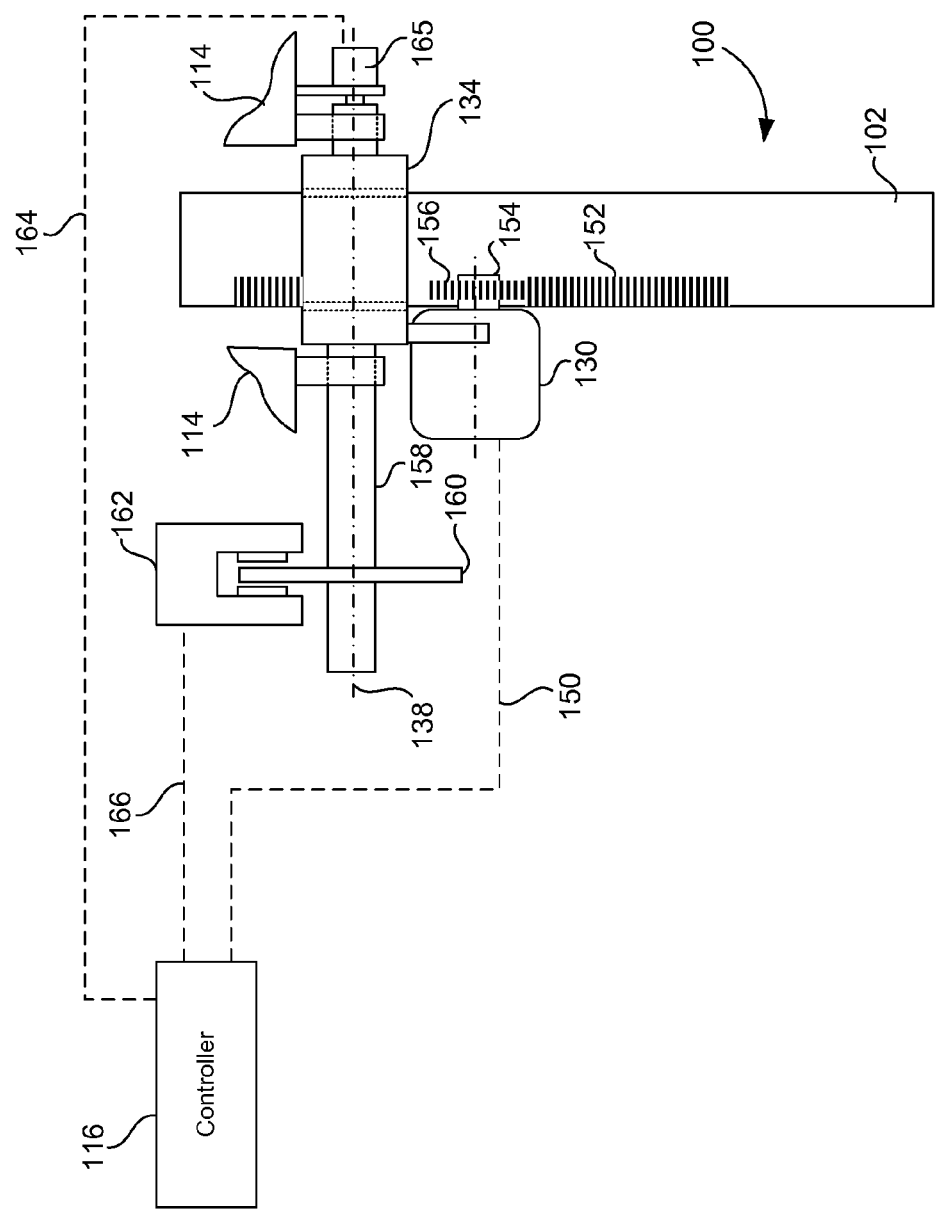
FIG. 5 shows a diagrammatic side view of the alternative embodiment of the FIG. 4.

FIG. 5 shows an end view of the wave energy converter of FIG. 4. In particular, it can be seen that the pendulum 102 has a rack 152 formed thereon. The pendulum adjuster 130 is in the nature of a motor having a shaft 154 extending therefrom. A gear 156 is attached to the shaft 154. Since the pendulum adjuster 130 can be in the nature of a servomotor, the pendulum adjuster 130 can rotate the gears 154 so as to cause the pendulum 102 to move upwardly and downwardly. As such, the center-of-gravity 128 can be suitably controlled. The mounting 134 is illustrated as attached to the pendulum 102. A shaft 158 extends along the pivot axis 138 of the pendulum 102. A disk 160 is affixed to the shaft 158 and extends radially outwardly therefrom. A caliper brake 162 is positioned over the disk 160 so as to exert frictional forces against the surface of the disk 160 in the event that a braking action is required. The controller 116, as stated previously, has a line 164 that is connected to the a rotary position sensor 165 which is coupled to shaft 158 so as to provide controller 116 with rotational position information and other data regarding the pivotal movement of the pendulum 102. Another line 166 is connected to the caliper brake 162. Another line 150 will be connected to the pendulum adjustor 130.

It should be noted that, in association with FIGS. 4 and 5, that the shaft 104 could have the coils 108 and 110 mounted thereon. The magnets 112 can be positioned in a fixed position relative to the linearly-reciprocating motion of such coils.

Figure 6:
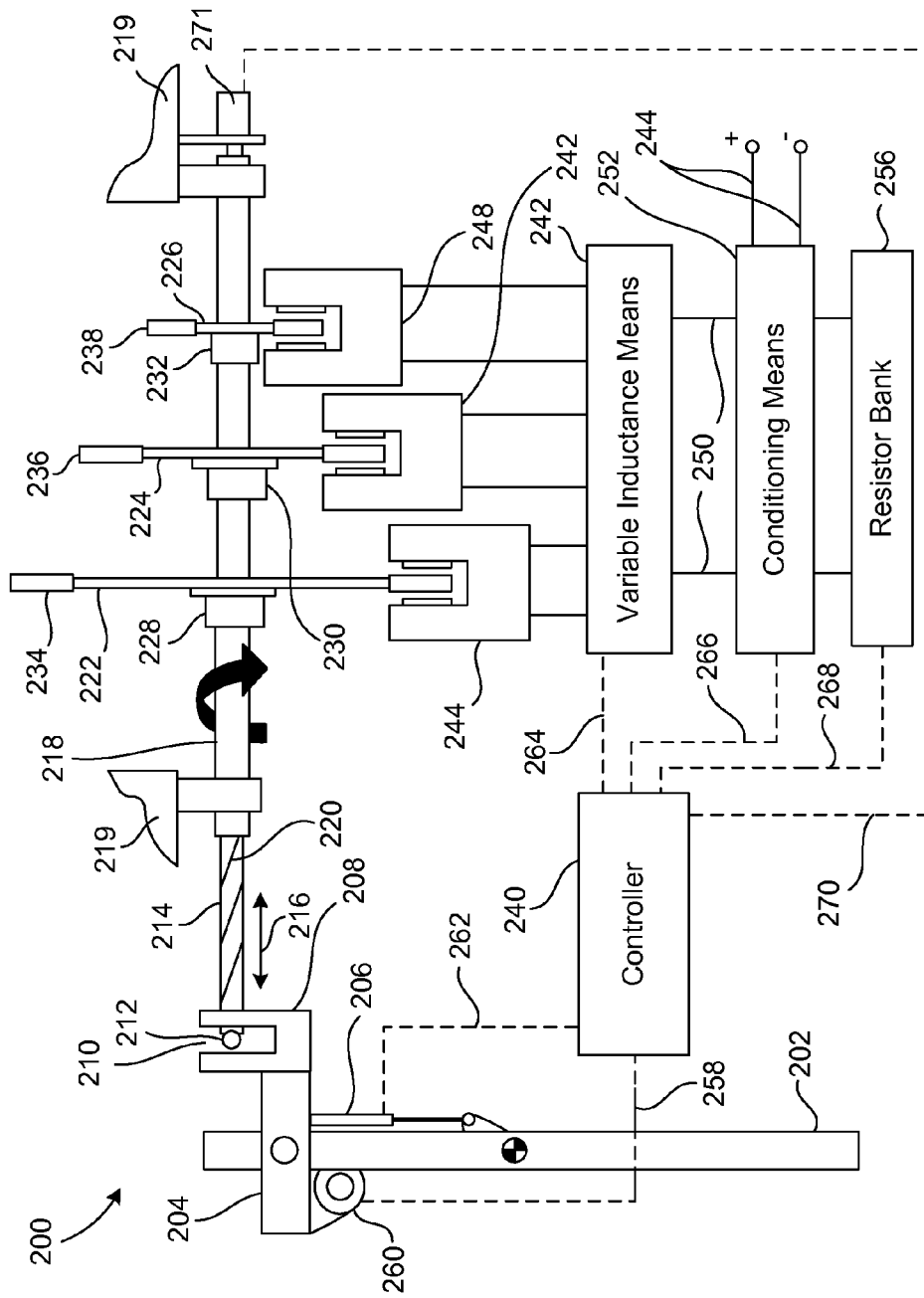
FIG. 6 is a diagrammatic illustration of a further version of the embodiment of FIG. 4 in which the linear reciprocating motion of the shaft causes a rotation movement of a hollow shaft positioned thereon.

FIG. 6 shows another embodiment 200 of the wave energy converter of the present invention. In FIG. 6, it can be seen that there is a pendulum 202 which has a configuration similar to the pendulum 102 of FIGS. 4 and 5. Pendulum 202 includes a mounting 204, a linear transducer 206 and a bracket 208 connected to the mounting 204. Bracket 208 also includes a slot 210 which receives pin 212 therein. A shaft 214 is connected to pin 212 and move back-and-forth in manner of arrow 216 in the manner described hereinbefore in association with FIGS. 4 and 5.

Importantly, in FIG. 6, there is a hollow shaft 218 that is applied over the exterior surface of the shaft 214. The shaft 214 has a helical surface 220 formed thereon. The term "helical surface" can refer to a helical groove formed therein or a helical gear formed thereon. Similarly, the interior surface of the hollow shaft 218 will mate with this helical surface 220. As a result, as the shaft 214 moves in one direction, the hollow shaft 218 will rotate in one direction. As the shaft 214 moves in the other direction, then the hollow shaft 218 will rotate in the other direction.

The hollow shaft 218 is supported by bearings secured to the shell 219. The hollow shaft 218 has a first disk 222, a second disk 224 and a third disk 226 mounted thereto. Disks 222, 224 and 226 extend radially outwardly of the hollow shaft 218. Disk 222 is connected to the hollow shaft 218 through the use of the unidirectional free-wheeling clutch 228. Disk 224 is connected to the hollow shaft 218 by another unidirectional free-wheeling clutch 230. Disk 226 is further connected to the hollow shaft 218 by another free-wheeling unidirectional clutch 232. As a result, the disks 222, 224 and 226 will rotate in only one direction. The disk 222 has a magnetic surface 234 formed on or attached to a periphery of the disk 222. The disk 224 also has a magnetic surface 236 affixed to or formed on the periphery of the disk 224. The disk 226 also has a magnetic surface 238 affixed to or formed on the periphery of the disk 226. The disk 222 can have a greater diameter than that of the disk 224. The disk 224 can have a greater diameter than that of the disk 226.

Within the concept of the present invention, all or some of the disks 222, 224 and 226 can be activated so as to rotate, depending upon the power requirements imparted to the wave energy converter 200. The selection of which of the disks 222, 224 and 226 to activate, and allow to rotate, can be depend upon the power production requirements of the system. Controller 240 is utilized so as to facilitate the production of power.

The variable inductance means 242 includes a first coil 244, a second coil 246 and third coil 248. The first coil 244 is cooperative with the magnetic surface 234 of the disk 222. The coil 246 is cooperative with the magnetic surface 236 of the disk 224. The coil 248 is cooperative with the magnetic surface 238 of the disk 226. As such, the power as produced from the coils 244, 246 and 248, can be delivered along lines 250 to the conditioning means 252 for delivery to the end user 254 or the grid. The resistor bank 256 is connected to the conditioning means 252 acting in the manner described herein previously in association with FIG. 1. Controller 240 has a line 258 connected to the pendulum adjuster 260. Another line 262 is connected to the linear transducer 206. Line 264 is connected to the variable inductance means 242. Line 266 is connected to the conditioning means 252. Line 268 is connected to the resistor bank 256. Another line 270 is connected to a rotary position sensor 271.

FIG. 6 shows a variation of the present invention where the oscillatory motions of the pendulum 202 are converted to linear oscillations of a linkage assembly and then rotatory motions of the magnets 234, 236 and 238 relative to the respective coils 244, 246 and 248. The shaft 214 is slidably connected to the mounting 204 as well to the hollow shaft 218. The linear reciprocating motion 216 is converted to rotatory motion of the hollow shaft 218. The shaft 214 has at least one helical surface located on its periphery that engages a mating feature within the interior of the hollow shaft 218. The relative motion between these features causes the hollow shaft 218 to rotate. The free-wheeling clutch and bearing assemblies 228, 230 and 232 allow conversion of linear motion of the shaft 214 to rotary motion of the respective disk 222, 224 and 226 when the shaft 214 is moving into engagement with the hollow shaft 218. This is the power stroke. When the shaft 214 retracts or moves to disengage from hollow shaft 218, clutches 228, 230 and 232 would allow the shaft 218 to rotate in the opposite direction without disturbing the rotation of the disks 22, 224 and 226. The rotary motion sensor monitors the speed of the hollow shaft 218 and provides a feedback signal along 270 to the controller 240. One of the controller's functions is to selectively engage and disengage the coils 244, 246 and 248 through the variable inductance means 242. Alternatively, and within the concept of the present invention, the clutches 228, 230 and 232 could also be connected to the controller 240 so as to selectively engaged or disengaged by a signal from the controller 240.

Figure 7:
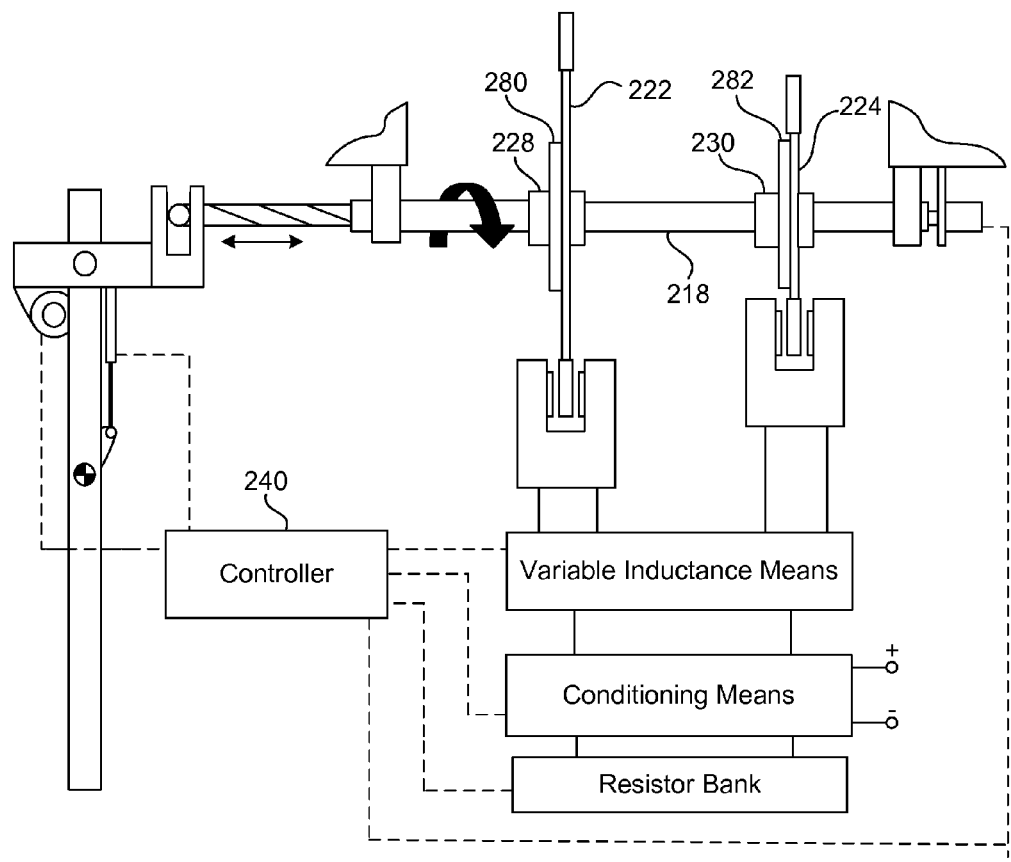
FIG. 7 is a diagrammatic illustration of a further version of FIG. 6 in which the disk having the magnets thereon are connected by a planetary gear set to the rotatable hollow shaft.

FIG. 7 shows a variation of the alternative embodiment of FIG. 6. In FIG. 7, it can be seen that the planetary gear 280 that serves to engage with the clutch 228 and with the disk 222. Similarly, another planetary gear 282 engages with the disk 224 and with the clutch 230. The clutches 228 and 230 are illustrated as in the manner of FIG. 6.

The planetary gears 280 and 282 serve to significantly increase the rotational speed of the disks 222 and 224 relative to the rotation of the shaft 218. As such, a single rotation of the hollow shaft 218 could produce several rotations of the respective disks 222 and 224. The clutches 228 and 230 could be directly controlled from the controller 240 so as to selectively engage and/or disengage from the hollow shaft 218.

Figure 8:
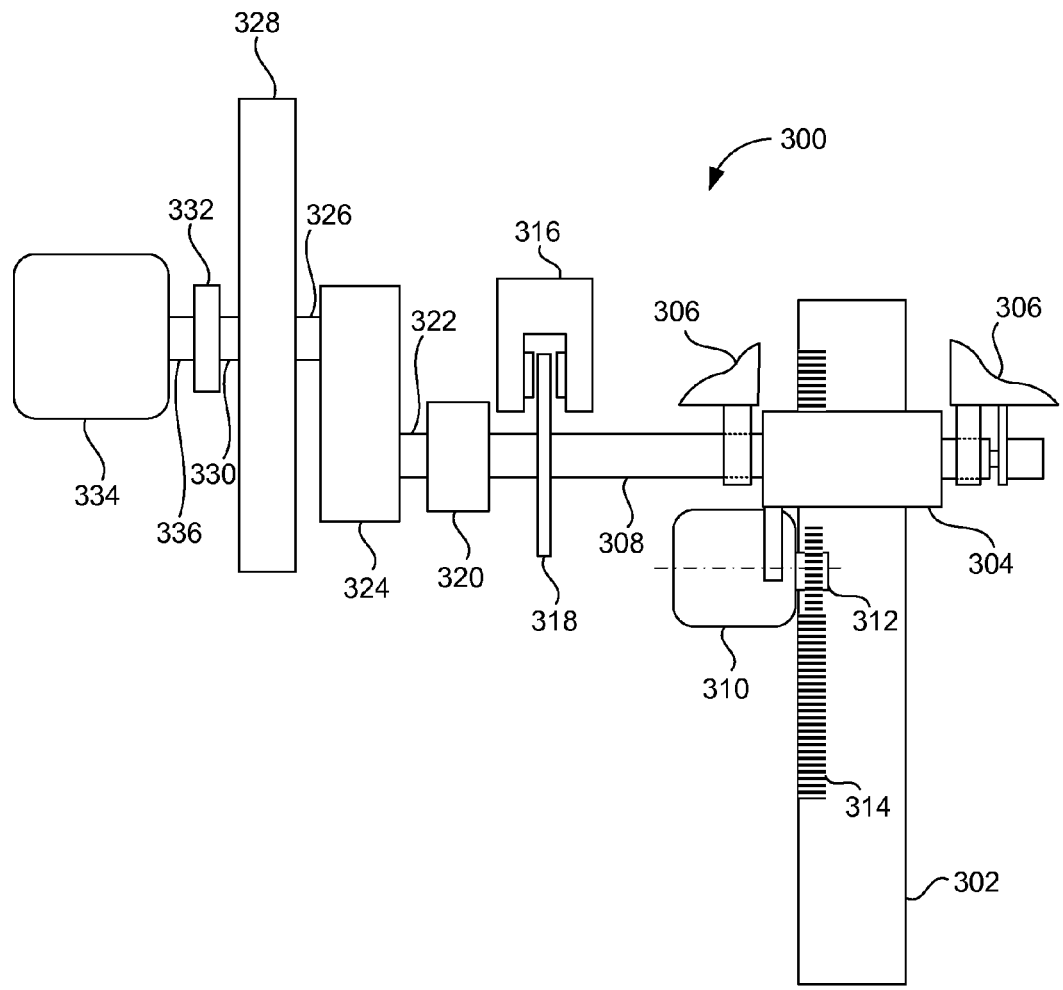
FIG. 8 is a diagrammatic illustration of further embodiment of the present invention in which a mechanical rectifier is interconnected between the generator and the shaft of the pendulum.

FIG. 8 shows still a further embodiment of the wave energy converter 300 of the present invention. Wave energy converter 300 includes a pendulum 302 having a housing 304 receiving the pendulum 302. The shell 306 supports a shaft 308 in a pivotal manner. A pendulum adjuster 310 has a gear 312 which engages with a rack 314 of the pendulum 302 so as to move the pendulum 302 upwardly and downwardly relative to the sensed wave motion affecting the shell 306 (as in the manner described herein previously). A caliper brake 316 is positioned over a disk 318. Disk 318 extends radially outwardly of the shaft 308. The caliper brake 316 includes pads which frictionally engage the surface of the disk 318 so as to slow or stop the pivoting motion of the pendulum 302.

In FIG. 8, it can be seen that there is a clutch 320 that is connected to the shaft 308. Clutch 320 can be controlled so as to engage or disengage with the shaft 308. The clutch 320 has input shaft 322 extending thereinto. Input shaft 322 is connected to the mechanical rectifier 324. Mechanical rectifier 324 has an output shaft 326. A flywheel 328 is mounted on the output shaft 326. The flywheel 328 is supported upon a shaft 330 that connects through clutch 332 to a generator 334. Clutch 332 can serve to disengage the shaft 336 of the generator 334 from the shaft 330 supporting the flywheel 328.

As stated herein previously, the mechanical rectifier 324 serves to convert the rotational back-and-forth rotational movement of the shaft 308 into a unidirectional rotational movement of the output shaft 326. Output shaft 326 will cause a rotation of the flywheel 328. As such, the flywheel 328 can serve as a power storage device and assures the consistent rotation of the shaft 336 of the generator 334. The wave energy converter 300 gives a power stroke in both directions of the pivotal movement of the pendulum 302. As such, the wave energy converter 300 provides a smooth delivery of power despite the back-and-forth movements of the pendulum 302 and the shaft 308.

Figure 9:
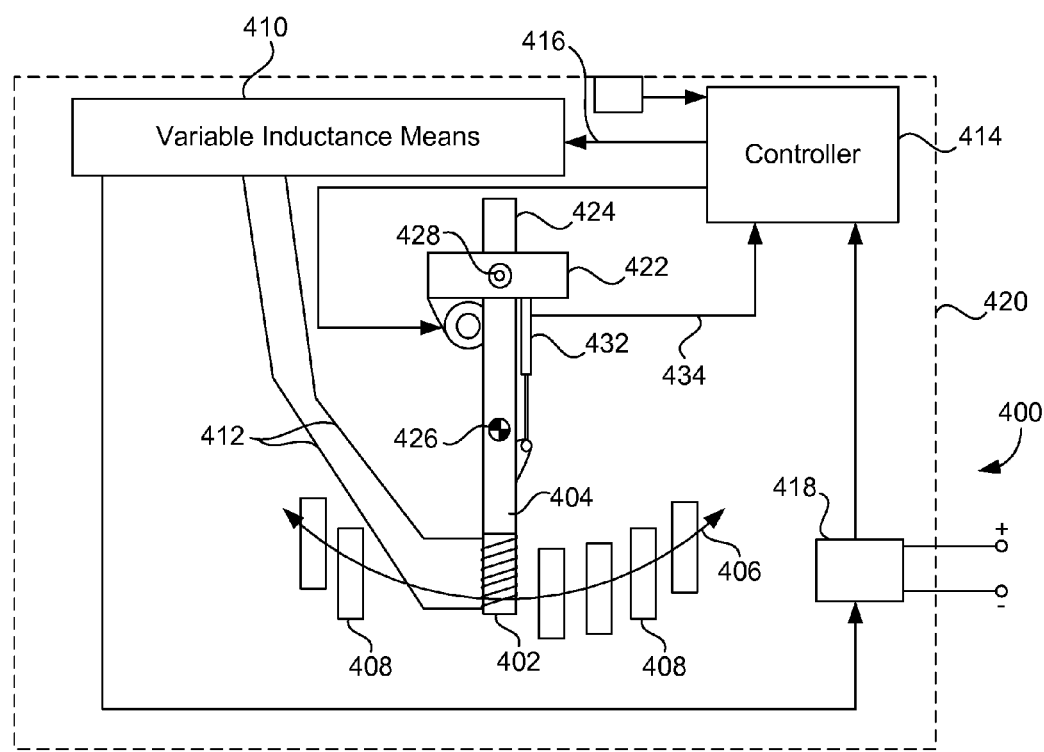
FIG. 9 is a diagrammatic illustration showing the present invention in which a coil, instead of a magnet, is connected to the pendulum.

It is important within the concept of the present invention that the pendulum can have either a magnet or a coil connected or interconnected thereto. FIG. 9 shows a wave energy converter 400 in which a coil 402 is connected to the pendulum 404. In particular, as the pendulum 404 moves back-and-forth in the direction of arrow 406, the coil 402 will pass along magnets 408 that are positioned along the path of the pendulum 404. The variable inductance means 410 has line 412 that is connected the coil 402. As such, power is produced from coil 402 during the motion of the pendulum 404. A controller 414 is connected to the variable inductance means 410. Similarly, a power conditioner 418 is connected to the controller 414. All of the components of the wave energy converter 400 are positioned within the shell 420.

In FIG. 9, it can be seen that the pendulum 404 is supported in a mounting 422 generally adjacent to the upper end 424 of the pendulum 404. The pendulum 404 has a center-of-gravity 426 and a pivot axis 428. A pendulum adjuster 430 serves to move the pendulum 404 upwardly and downwardly so as to adjust the relation between the center-of-gravity 426 and the pivot axis 428 relative to the conditions of the seas affecting the shell 420. A linear transducer 432 is cooperatively mounted to the pendulum 404 so as to transmit a position signal along line 434 to the controller 414.

Figure 10:
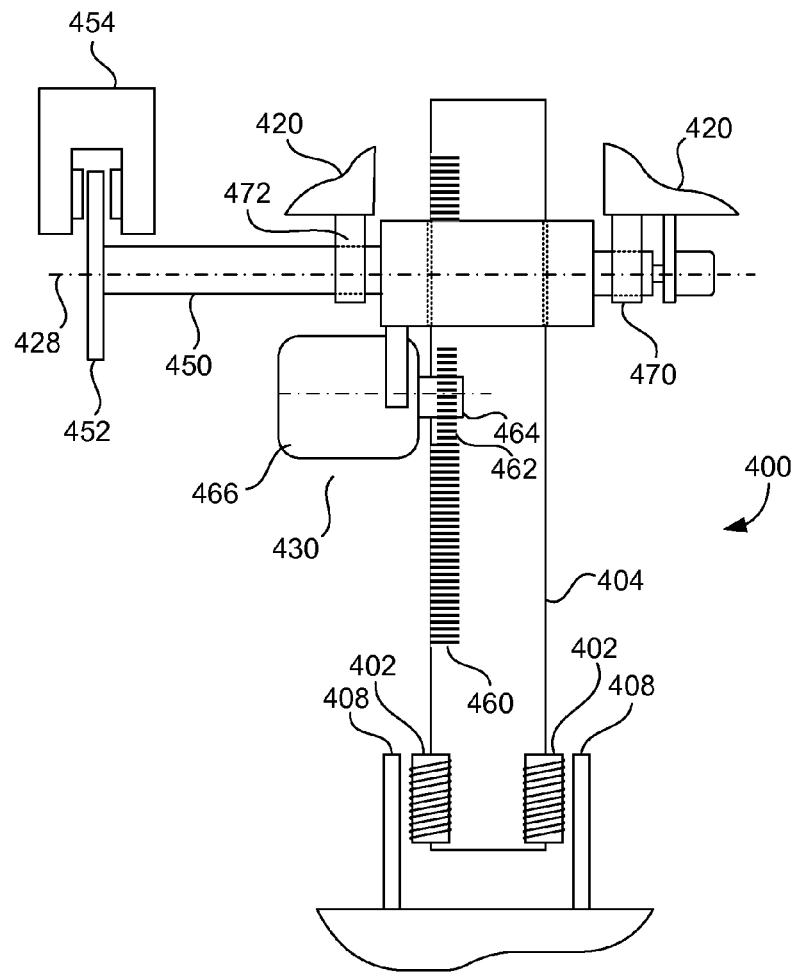
FIG. 10 is a diagrammatic illustration of the embodiment of the present invention of FIG. 9 showing the coil as connected to the pendulum.

FIG. 10 shows a side view of the wave energy converter 400 of FIG. 9. In FIG. 10, it can be seen that the coil 402 is located at the bottom end of the pendulum 404. The magnets 408 are positioned on opposite sides of the coil 402. The pendulum 404 has a shaft 450 connected thereto generally at the pivot axis 428. As such, the shaft 450 will rotate back-and-forth with the pivotal movement of the pendulum 404. A disk 452 extends radially outwardly of the shaft 450. A caliper brake 454 is cooperative with the disk 452 so as to impart frictional forces thereto so as to slow the rotation of the shaft 450 and the attached pendulum 404, as required. The length of the pendulum 404 and, in particular, the distance between the pivot axis 428 and the center-of-gravity 426 is controlled by a pendulum adjuster 430. As in the previous embodiments, there is a rack 460 formed on the pendulum 404 that engages with a gear 462 secured to a shaft 464 of the motor 466 of the pendulum adjuster 430.

In FIG. 10, it can be seen that the shaft 450 is supported by bearings 470 and 472 extending from the shell 420. As a result, the pendulum 404 is free to rotate independent of the movement of the shell 420.

Figure 11:
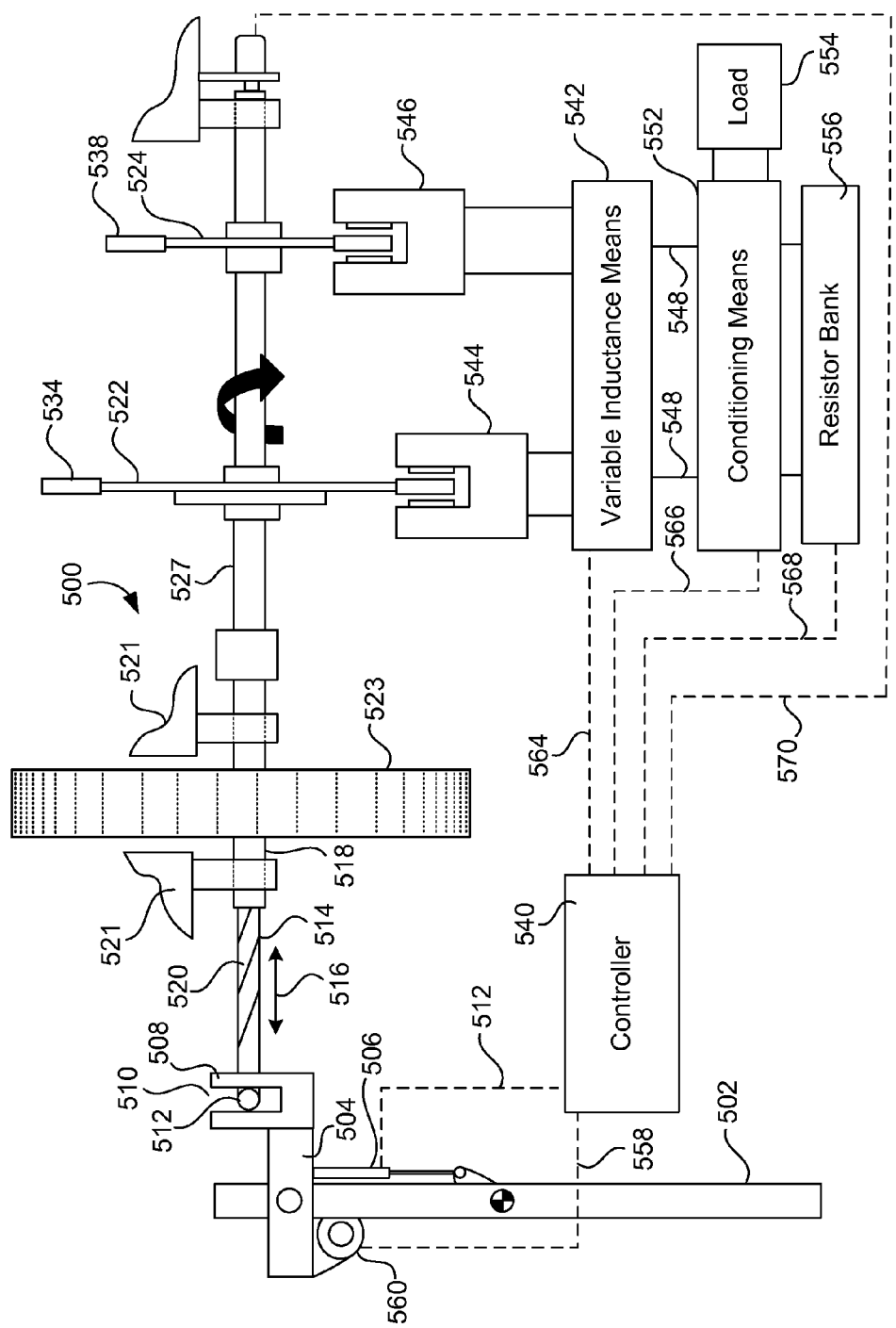
FIG. 11 is a diagrammatic illustration of a further embodiment of the present invention in which a linear drive arrangement couples the pendulum to a flywheel.

FIG. 11 shows another embodiment 500 of the wave energy converter of the present invention. In FIG. 11, it can be seen that there is pendulum 502 which has a configuration similar to the pendulum 102 of FIGS. 4 and 5. Pendulum 502 includes a mounting 504, a linear transducer 506, and a bracket 508 connecting to the mounting 504. Bracket 508 also includes a slot 510 which receives a pin 512 therein. A shaft 514 is connected to the pin 512 so as to move back-and-forth in the path of arrow 516 in the manner described hereinbefore in association with FIGS. 4 and 5.

In FIG. 11, there is a hollow shaft 518 that is applied over the exterior surface of the shaft 514. The shaft 514 has a helical surface 520 formed thereon. The term "helical surface" can refer to a helical groove formed therein or a helical gear formed thereon. Similarly, the interior surface of the hollow shaft 518 will mate with the helical surface 520. As a result, as the shaft 514 moves in one direction, the hollow shaft 518 will rotate in one direction. The shaft 514 moves in the other direction, the hollow shaft 518 will not rotate.

The hollow shaft 518 is supported by bearings on the shell 521. The hollow shaft 518 has a flywheel 523 mounted thereon. The flywheel 523 has a suitable diameter so that the kinetic energy associated with the rotation of the shaft 518 by the movement of the pendulum 502 is stored. The hollow shaft 518 has a first disk 522 and a second disk 524 interconnected thereto. Disks 522 and 524 extend radially outwardly of the shaft. Disk 522 will rotate relative to the rotation of the shaft 518. Similarly, disk 524 will also rotate in relation to the rotation of the shaft 518. The disks 522 and 524 rotate in only one direction. The disk 522 has a magnetic surface 534 formed on or attached to the periphery thereof. Disk 524 has a magnetic surface 538 affixed to or formed on the periphery thereof. Disk 522 has a greater diameter than that of the disk 524.

Within the concept of the present invention, one or both of the disks 522 and 524 can be activated so as to rotate in correspondence with the power requirements imparted by the wave energy converter 500. Controller 540 is utilized so as facilitate the production of power in the manner described herein in association with the previous embodiments of the present invention.

The variable inductance means 542 includes a first coil 544 and a second coil 546. The first coil 544 is cooperative with the magnetic surface 534 of the disk 522. The second coil 546 is cooperative with the magnetic surface 538 of the disk 524. As a result, power, as produced from the coils 544 and 546, can be delivered along lines 548 to the conditioning means 552 for delivery to the utility 554 or the grid. The resistor bank 556 is connected to the conditioning means 552 for storing heat in the manner described herein previously in association with FIG. 1. Controller 540 has a line 558 connected the pendulum adjuster 560. Another line 562 is connected to the linear transducer 506. Line 564 is connected to the variable inductance means 542. Line 566 is connected the conditioning means 552. Line 568 is connected to the resistor bank 556. Another line 570 is connected to the axis of rotation of the shaft 518.

FIG. 11 shows a linear drive arrangement for coupling the pendulum 502 to the flywheel 523. The reciprocating motion 516 causes the flywheel 523 to rotate. The flywheel 523 is coupled to another shaft 527 which drives the disks 522 and 524 so as to cause relative motion between the magnetic surfaces 534 and 538 and the respective coils 544 and 546. This action generates electricity. The variable inductance means 542 operates under the instruction of the controller 540 so as to selectively activate the number of coils (also known as "windings") 544 and 546. This generates electrical energy. The action actively varies the inductive capacity of the wave energy converter 500 and therefore can cause damping.

Figure 12:
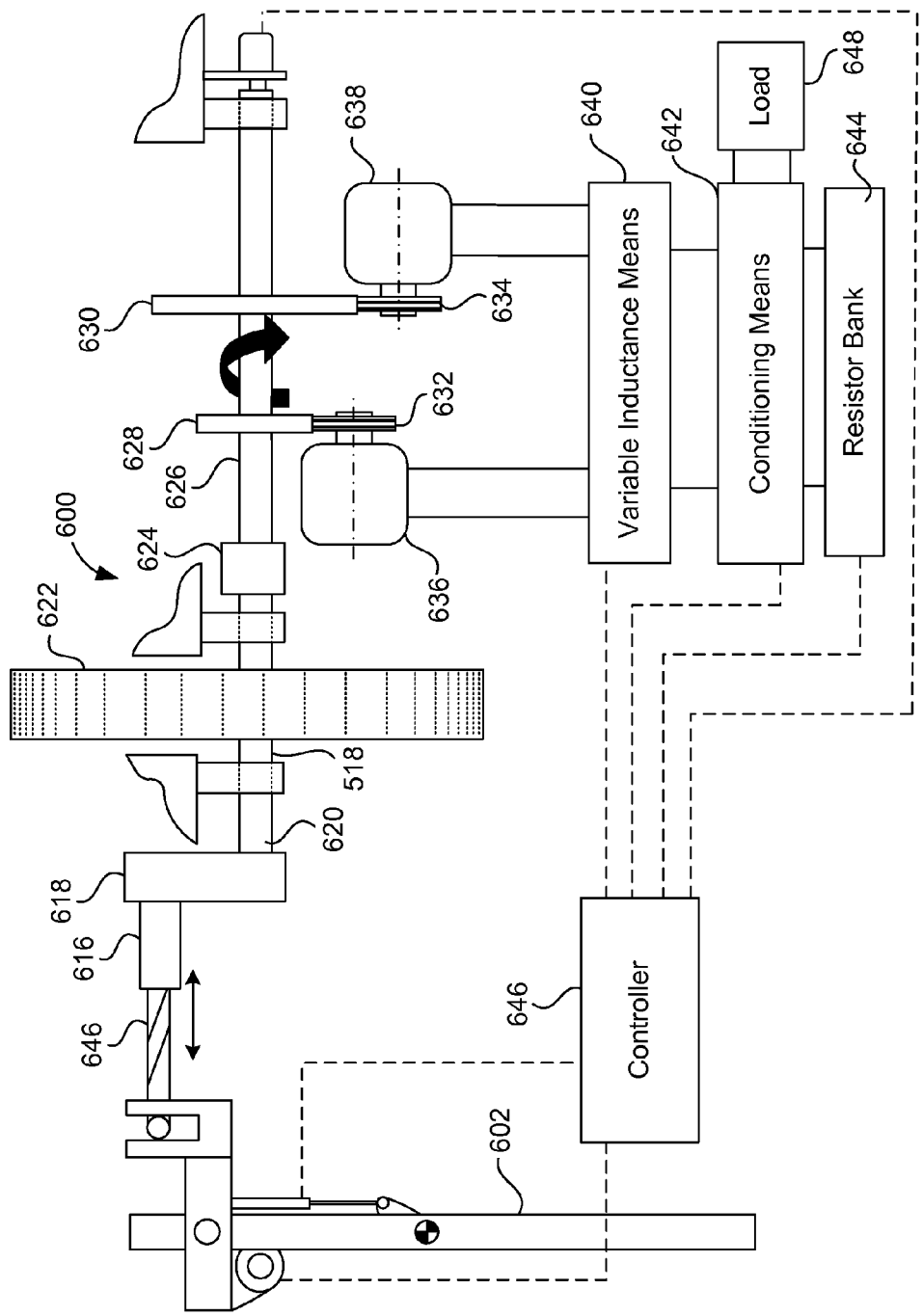
FIG. 12 is an illustration of a further embodiment of the present invention having a linear drive arrangement in which the flywheel drive is a shaft and a geared connections to generators.

FIG. 12 shows another embodiment 600 of the wave energy converter of the present invention. The wave energy converter 600 is a variation of the embodiment 500 as shown in FIG. 11. In particular, in FIG. 12, the pendulum 602 has a configuration similar to that shown in FIG. 11. However, in FIG. 12, the shaft 614 is coupled to the hollow shaft 616. Hollow shaft 616 is connected a gear box 618. The gear box 618 has an interior thereof which allows for a single rotation of the hollow shaft 616 to cause a multiplier of the rotation of shaft 620. As such, the flywheel 622 can rotate at a rate greater than a rate of rotation of the shaft 616. A clutch 624 serves to connect with another shaft 626. Shaft 626 has a first gear 628 and a second gear 630 mounted thereon. As such, the rotation of the shaft 626 will impart a similar rotation to the gears 628 and 630. Gears 628 and 630 are connected to respective pinions 632 and 634 in a geared arrangement. Pinion 632 is connected to the shaft of a first generator 636. Pinion 634 is connected to the shaft of another generator 638. Generators 636 and 638 are coupled to the variable inductance means 640, the conditioning means 642, the resistor bank 644, the controller 646 and the load 648 in the manner described herein in association with FIG. 11.

The flywheel 622 drives the shaft 626 and the gears 628 and 630. The gears 620 and 630 are coupled to mating pinions 632 and 634 on the shafts of generators 636 and 638. The number of active generators is selectively controlled by the controllers 646 and the variable inductance means 640. This action actively varies the inductance capacity of the wave energy converter 600 and therefore the damping.

Figure 13:
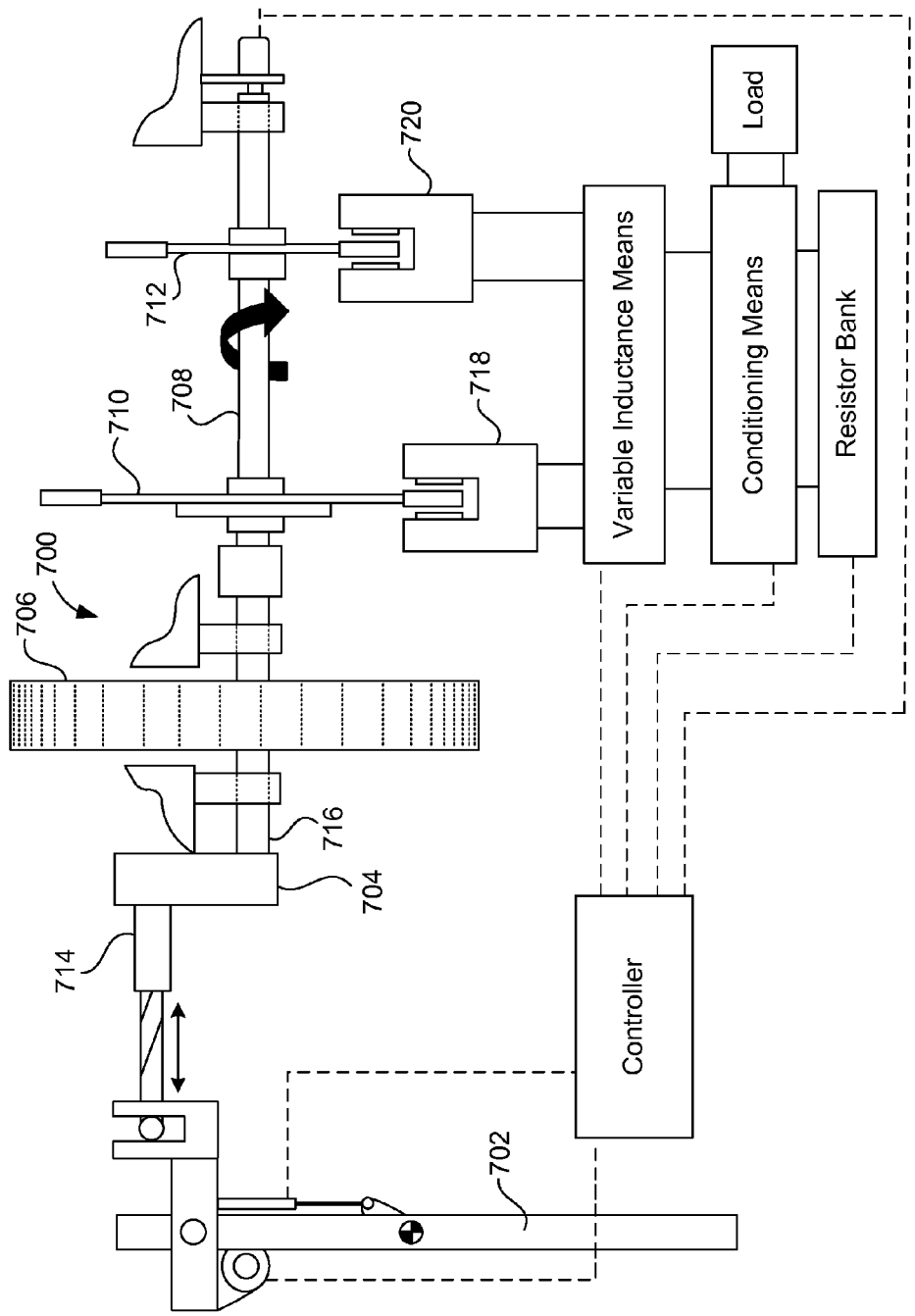
FIG. 13 is a diagrammatic illustration of a further embodiment of the present invention in which a linear drive arrangement coupled to a gear box for the purpose of increasing speed to a flywheel.

FIG. 13 shows another variation of the embodiment of FIG. 11 in which the wave energy converter 700 has a pendulum 702, a gear box 704, a flywheel 706 and a rotatable shaft 708. The pendulum 702, along with the gear box 704, has a configuration similar to that described herein previously in association with FIG. 12. Additionally, the flywheel 706 serves to conserve kinetic energy and to facilitate the rotation of the shaft 708. Shaft 708 has a first disk 710 and a second disk 712 mounted thereon. Disks 710 and 712 have a configuration similar to that described herein previously in association with FIG. 11. In FIG. 13, the linear drive arrangement is connected to the gear box 704 for the purpose of increasing the speed of the flywheel 706. This linear arrangement acts as an input shaft 714 of the gear box 704 so as to increase the speed of the output shaft 716 that is connected to a flywheel 706. As such, this provides a multiplier effect upon the speed of the rotation of the disks 710 and 712 in relation to the coils 718 and 720. The operation of the embodiment of the wave energy converter 700 is, in all other respects, identical to that described in association with FIG. 11.

Figure 14:
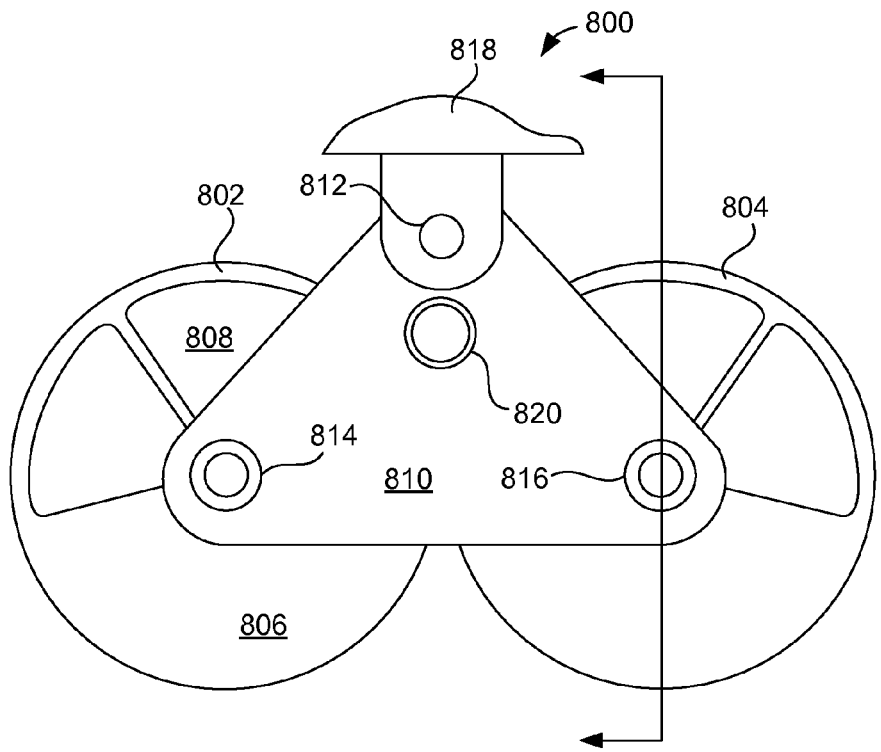
FIG. 14 is a frontal view of an alternative pendulum configuration as used in the present invention.

Within the concept of the present invention, the pendulum can take on various configurations. Although an "elongate member" has been recited herein previously, it is known that the pendulum can have a variety of other configurations which can carry out the proper functions of the pendulum of the present invention. FIG. 14 is illustrative of a pendulum system 800 that can be used in place of the elongate member of the previous embodiments of the present invention. The pendulum arrangement 800 has a pair of disks 802 and 804. The mass center of each of the disks 802 and 804 does not lie at the geometric center. As can be seen, disk 802 has a relatively heavy and solid portion 806 and a lighter weight portion 808. Disk 804 has a similar configuration. The disks 802 and 804 are supported by mounting plate 810. The mounting plates 810 are supported by a shaft 812. At least one of the mounting plates 810 is rigidly coupled to shaft 812 so as to properly transmit torque.

Each of the disks 802 and 804 is supported by second shaft arrangements 814 and 816. Shaft arrangements 814 and 816 are also supported by the mounting plates 810. The shaft 812 is supported on a bearing arrangement which is part of the mounting arrangement attached to the shell 818. The disks 802 and 804 are rotationally coupled together. As will be described hereinafter, one method of rotational coupling is accomplished by placing mating gear teeth on the perimeter of each of the disks 802 and 804. Other coupling arrangements are possible within the concept of the present invention.

A rotary actuator 820 is supported by at least one of the mounting plates 810. The actuator 820 is rotationally coupled to at least one of the disks 802 and 804 for the purpose of rotating the mass center of the disk relative to the respective shafts 814 and 816. This action also serves to move the composite center of mass of the pendulum 702 relative to its pivot (which is defined by the longitudinal centerline of shaft 812). The pendulum's oscillatory motion that results from wave-induced motion on shell 818 causes the pendulum to drive the shaft 812. This shaft is coupled to a power take-off capability for the purpose of generating useful energy.

Figure 15:
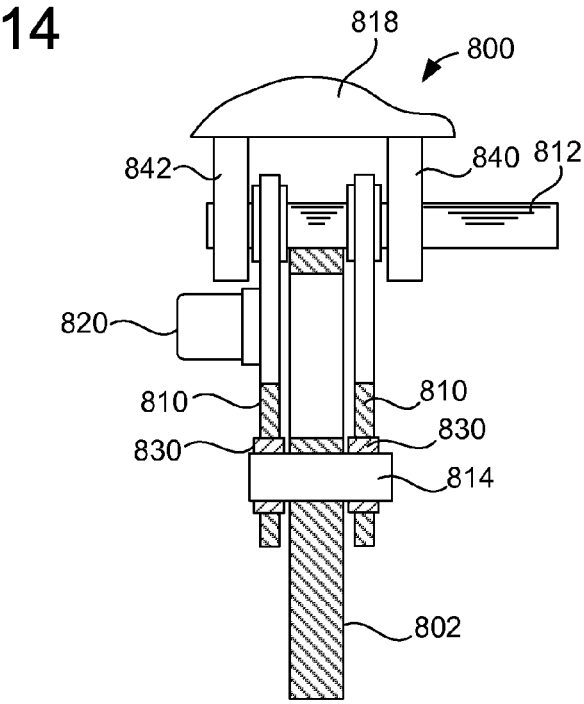
FIG. 15 is a cross-sectional view as taken across lines 15-15 of FIG. 14 of the alternative pendulum arrangement of the present invention.

As can be seen in FIG. 15, the pendulum 800 is illustrated in a side view. The pendulum 800 is shown as having the disk 802 mounted about the shaft arrangement 814. Shaft arrangement 814 is supported by bearings 830 on mounting plates 810. The mounting plates 810 are shown in parallel. The shell 818 includes bearings 840 and 842 which support the shaft 812. The rotary actuator 820 is supported by the mounting plate 810. The rotary actuator 820 is rotationally coupled to the disk 802 for the purpose of rotating the mass center of the disk 802 relative to the shaft 814.

Figure 16:
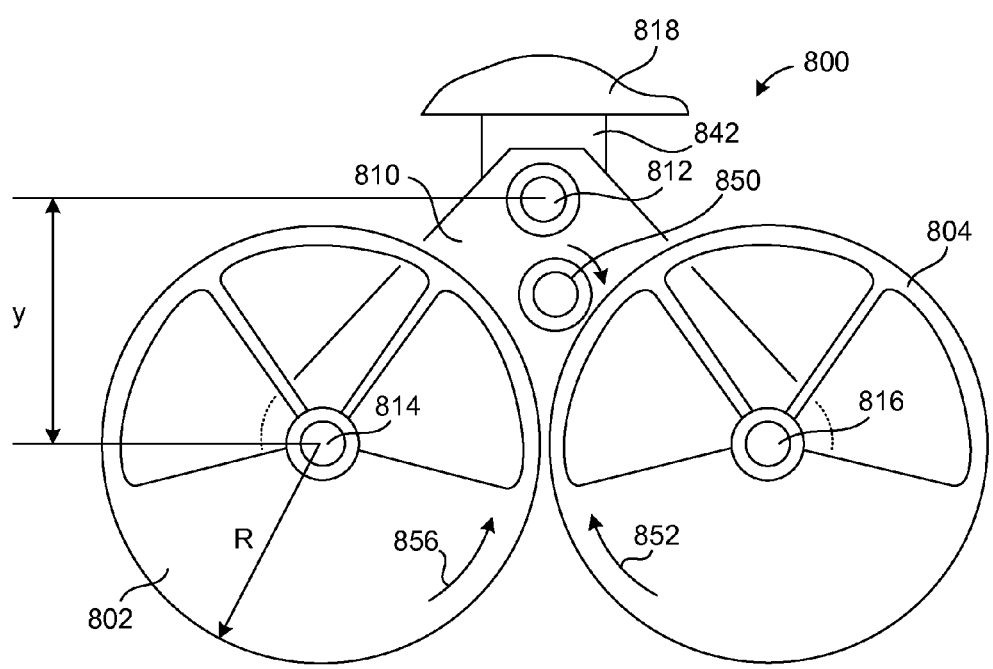
FIG. 16 is a frontal view of the alternative pendulum arrangement of the present invention with the near-side mounting plate removed for clarity.

FIG. 16 illustrates the pendulum configuration 800 of FIGS. 14 and 15 with one of the mounting plates 810 removed for the purpose of clarity. In particular, in FIG. 16, there is a pinion gear 850 that is rotationally coupled to the disk 804. The pinion gear 850 is rigidly coupled to the rotary actuator 820 such that the actuator will rotate the pinion 850 which, in turn, rotates the disk 804 and the disk 802 so as to relocate the mass centers thereof. The disk 804 is coupled to the disk 802 by way of mating teeth or other frictional engagements. The action of rotation is illustrated by arrows 852 and 856. As such, the rotary actuator is operable in a bi-directional manner. Additionally, multiple pinions gears 850 can be utilized so as to rotate the disks 802 and 804, as well as the pinions, that are coupled to the rotary actuator via a gear box arrangement.

When the pendulum 800 is oscillating on the shaft 812, the disks 802 and 804 need to be substantially stationary relative to the mounting plates 810 so as not to disturb the location of the mass center of the pendulum relative to the longitudinal axis of the shaft 812. This avoids secondary motions which can adversely influence the gross motion of the pendulum 800. This can be accomplished by including a breaking/holding capability internally or externally to the rotary actuator 812. Additionally, it is possible that any number of breaking/holding capabilities can be utilized so as to rigidly couple the mounting plates 810 with the disks 802 and 804. This can be accomplished by mounting a breaking/holding capability which acts either directly between the disks 802 and 804 and the mounting plates 810 or alternately acts through the respective shafts 814 and 816.

As can be seen in FIG. 16, the distance "y" is bounded by the relationship $1.5*R<y<0.01*R$.

Figure 17:
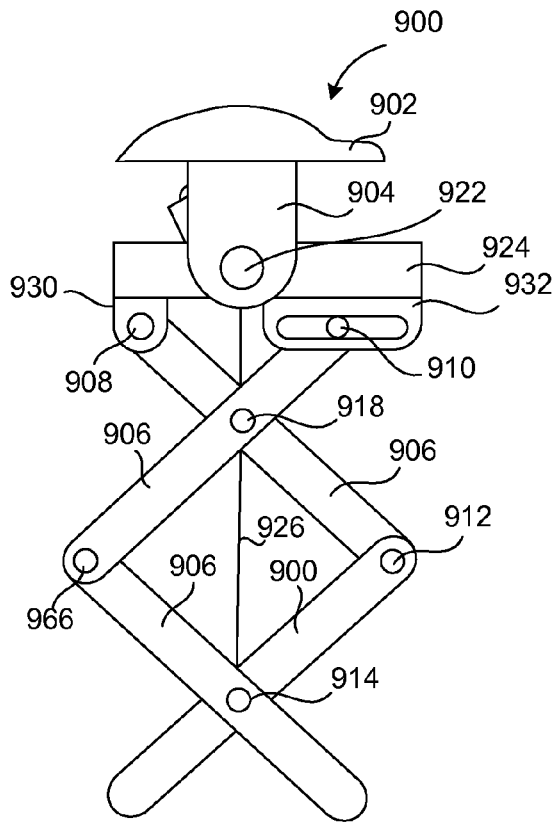
FIG. 17 is a frontal view of another alternative pendulum arrangement as used in the wave energy converter of the present invention.

FIG. 17 shows a further variation of the pendulum arrangement 900 of the present invention. Importantly, the elongate member of the pendulum of the earlier embodiments or the disk-like pendulum of the previous embodiment can be replaced with various shapes, either singular or in combination, so as to achieve the same effect of allowing the shapes to be rotated about an axis whose location is offset by some distance from its mass center. For example, a pair of cams can be utilized or alternating triangles. Additionally, it is possible to use a set of multiple links that can be fashioned in a manner so as to allow for the composite mass center to be adjustable relative to a pivot axis. FIG. 17 shows such a mechanism.

In FIG. 17, it can be seen that the pendulum arrangement 900 is supported by the shell 902 and the bearing system 904. The pendulum arrangement 900 includes an arrangement of links 906 that are assembled together with various pinned connections 908, 910, 912, 914, 916 and 918. These pin connections operate in a manner such that the links 906 can be retracted close to the pivot axis of the pendulum arrangement 900. The pivot axis is defined by the longitudinal axis of shaft 922 which is rigidly connected to the mounting assembly 924. The links 906 are raised and lowered using the action of a hoist and a rope 926. The action of raising and lowering the links 906 allows for a repositioning the composite mass center of the pendulum arrangement 900 relative the shaft 922. Shaft 922 is supported by the bearing arrangement 904 which is part of a mounting arrangement attached to the shell 902 of the wave energy converter. The mounting assembly 924 has a fixed position pin arrangement 930 and a sliding pin arrangement 932 which provides for the support of the links 906.

Figure 18:
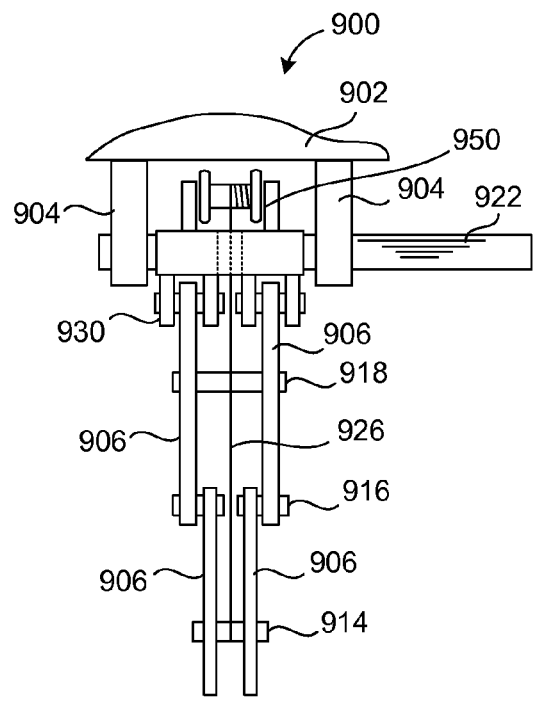
FIG. 18 is a side elevational view of the alternative pendulum arrangement of the FIG. 17.

FIG. 18 is a side view showing the pendulum arrangement 900. In FIG. 18, it can be seen that the hoist 950 has the rope 926 extending therefrom. The hoist 950 will have an internal breaking/holding capability so as to allow the links 906 to be supported by the hoist 950 and the rope 926.

The oscillatory motion of the pendulum arrangement 900 results from wave-induced motion impacting the shell 902. This causes the pendulum to drive the shaft 922. The shaft 922 can be coupled to a powered take-off capability for the purpose of generating useful energy.

Importantly, there are various combinations of links and actuators that can be assembled so as to accomplish similar results to those shown in FIGS. 17 and 18 for the purpose of having a pendulum configuration which can actively have a mass center moved relative to a pivot axis. All actuators that are used to reposition the pendulum's mass center for each of the embodiments shown in FIGS. 17 and 18 can have a position sensing capability that allows feedback of the actuator's actions to the controller. This feedback is used to verify the pendulum's mass center position.

The foregoing disclosure and description of the invention is illustrative and explanatory thereof. Various changes in the details of the illustrated construction can be made within the scope of the appended claims without departing from the true spirit of the invention. The present invention should be limited by the following claims and their legal equivalents.

I claim:

1. A wave energy converter comprising:
    a shell;
    a pendulum pivotally positioned in said shell, said pendulum having a magnet or a coil connected or interconnected thereto;
    a variable inductance means for varying an inductive capacity, said variable inductance means being positioned in said shell, said variable inductance means having the other of said magnet or said coil connected or interconnected thereto, said magnet or said coil of said pendulum oscillating relative to the other of said magnet or said coil of said variable inductance means;
    a shaft connected to said pendulum such that said shaft rotates in relation to said pivotal movement of said pendulum;
    a wheel connected to said shaft so as to rotate in correspondence with the rotation of said shaft, said variable inductance means comprising an electrical generator having a shaft in engagement with said wheel; and
    a mechanical rectifier connected to between said shaft and said wheel such that said wheel rotates in only a single direction, said shaft being an input shaft of said mechanical rectifier, said mechanical rectifier having an output shaft, said wheel being affixed to said output shaft.

2. The wave energy converter of claim 1, said variable inductance means comprising a plurality of electrical generators selectively engaged with said wheel.

3. The wave energy converter of claim 2, further comprising:
    a controller electronically connected to said plurality of electrical generators so as to selectively engage one or more of said plurality of electrical generators in operative connection with said wheel.

4. The wave energy converter of claim 1, said wheel having teeth formed on a periphery thereof, said shaft of said electrical generator having a pinion thereon in toothed engagement with said teeth of said wheel.

5. The wave energy converter of claim 1, further comprising:
    a braking means for stopping or slowing the rotation of said shaft and for stopping or slowing the pivotal movement of said pendulum.

6. The wave energy converter of claim 5, said braking means comprising:
    a disk affixed to said shaft and extending radially outwardly thereof; and
    a caliper brake positioned over a surface of said disk so as to selectively exert a frictional force against said disk.

7. The wave energy converter of claim 1, said shaft of said electrical generator having a clutch operatively connected thereto so as to selectively release said shaft of said electrical generator from operative connection with the rotation of the wheel.

8. A wave energy converter comprising:
    a shell;
    a pendulum pivotally positioned in said shell, said pendulum having a magnet or a coil connected or interconnected thereto;
    a variable inductance means for varying an inductive capacity, said variable inductance means being positioned in said shell, said variable inductance means having the other of said magnet or said coil connected or interconnected thereto, said magnet or said coil of said pendulum oscillating relative to the other of said magnet or said coil of said variable inductance means; and a shaft slidably positioned in said shell, said shaft being interconnected to said pendulum such that a pivotal movement of said pendulum causes a linear reciprocating motion of said shaft.

9. The wave energy converter of claim 8, said pendulum having a pivotal mounting adjacent an end thereof, said mounting having a bracket connected thereto, said bracket having a slot therein, said shaft having a pin received in said slot of said bracket, said pin slidable in said slot during the pivotal movement of said pendulum so as to correspondingly cause the linear reciprocating motion of said shaft.

10. The wave energy converter of claim 8, said variable inductance means comprising at least one magnet positioned on or connected to said shaft and at least one coil positioned adjacent to the magnet, the coil being of a fixed positioned relative to the linear reciprocating motion of the shaft.

11. The wave energy converter of claim 8, further comprising:

a hollow shaft positioned over said shaft such that the linear reciprocating motion of said shaft causes a rotational movement of said hollow shaft; and at least one disk connected to or interconnected to said hollow shaft so as to selectively rotate relative to the rotational movement of said hollow shaft.

12. The wave energy converter of claim 11, said variable inductance means comprising:

a magnetic surface formed on or affixed to the disk; and a coil positioned in proximity to said magnetic surface of the disk.

13. The wave energy converter of claim 11, said shaft having a helical surface thereon, said hollow shaft having a surface on an interior thereof engaged with said helical surface of said shaft.

14. The wave energy connector of claim 13, further comprising:

a flywheel connected to said hollow shaft, the disk being mounted to a shaft in selective engagement with said hollow shaft.

15. The wave energy connector of claim 13, further comprising:

a gearbox having an input shaft and an output shaft, said hollow shaft connected to or acting as said input shaft to said gearbox, the disk affixed to a shaft in selective engagement with said output shaft of the gearbox.

16. The wave energy connector of claim 15, further comprising:

a flywheel connected to said output shaft of said gearbox.

17. The wave energy converter of claim 11, said disk having a uni-directional clutch in engagement with said hollow shaft.

18. The wave energy converter of claim 11, the disk comprising a plurality of disks connected to or interconnected to said hollow shaft, said each of said plurality of disks having a different outer diameter.

19. The wave energy converter of claim 11, said disk being connected by a gear arrangement such that said disk rotates at a faster rate of rotation at a rate of rotation of said hollow shaft.

20. A wave energy converter comprising:

a shell;

a pendulum pivotally positioned in said shell, said pendulum having a magnet or a coil connected or interconnected thereto;

a variable inductance means for varying an inductive capacity, said variable inductance means being positioned in said shell, said variable inductance means having the other of said magnet or said coil connected or interconnected thereto, said magnet or said coil of said pendulum oscillating relative to the other of said magnet or said coil of said variable inductance means, said pendulum comprising:

a shaft;

a mounting plate affixed to said shaft; and a disk rotatably connected to said mounting plate, said disk having a mass center offset from a geometric center of said disk.

* * * * *